(12) United States Patent
Farmer et al.

(10) Patent No.: US 11,447,684 B2
(45) Date of Patent: Sep. 20, 2022

(54) METHODS FOR PARAFFIN REMOVAL AND EXTENDED POST-PRIMARY OIL RECOVERY

(71) Applicant: Locus Oil IP Company, LLC, Solon, OH (US)

(72) Inventors: Sean Farmer, Ft. Lauderdale, FL (US); Ken Alibek, Solon, OH (US); Karthik N. Karathur, Solon, OH (US); Andrew R. Lefkowitz, Solon, OH (US); Anthony Nerris, Solon, OH (US); Tyler Dixon, Kent, OH (US); Alibek Moldakozhayev, Solon, OH (US); Martin R. Shumway, Solon, OH (US)

(73) Assignee: LOCUS OIL IP COMPANY, LLC, Solon, OH (US)

( * ) Notice: Subject to any disclaimer, the term of this patent is extended or adjusted under 35 U.S.C. 154(b) by 0 days.

(21) Appl. No.: 17/268,473

(22) PCT Filed: Aug. 20, 2019

(86) PCT No.: PCT/US2019/047186
§ 371 (c)(1),
(2) Date: Feb. 14, 2021

(87) PCT Pub. No.: WO2020/041258
PCT Pub. Date: Feb. 27, 2020

(65) Prior Publication Data
US 2021/0179925 A1    Jun. 17, 2021

Related U.S. Application Data

(60) Provisional application No. 62/719,773, filed on Aug. 20, 2018.

(51) Int. Cl.
*C09K 8/524* (2006.01)
*E21B 33/13* (2006.01)
(Continued)

(52) U.S. Cl.
CPC .............. *C09K 8/524* (2013.01); *C09K 8/584* (2013.01); *C09K 8/594* (2013.01); *E21B 33/13* (2013.01); *E21B 37/06* (2013.01); *E21B 43/16* (2013.01)

(58) Field of Classification Search
CPC .......... C09K 8/524; C09K 8/584; E21B 33/13
(Continued)

(56) References Cited

U.S. PATENT DOCUMENTS 3,191,676 A    6/1965  Froning
3,581,824 A    6/1971  Hurd
(Continued)

FOREIGN PATENT DOCUMENTS

CN    102352227 A    2/2012
CN    102399547 A    4/2012
(Continued)

OTHER PUBLICATIONS

Amani, H., et al., "Comparative study of biosurfactant producing bacteria in MEOR applications." Journal of Petroleum Science and Engineering, 2010, 75: 209-214.
(Continued)

*Primary Examiner* — William D Hutton, Jr.
*Assistant Examiner* — Ashish K Varma
(74) *Attorney, Agent, or Firm* — Saliwanchik, Lloyd & Eisenschenk

(57) ABSTRACT

The subject invention provides a three-part method for increasing the amount of oil recovered from an oil well, the method comprising (1) paraffin removal; (2) gas release; and (3) plugging. The combination of parts provides for
(Continued)

enhanced oil recovery over an extended period of time, for example two weeks or longer. In preferred embodiments, the subject invention utilizes microorganisms and/or their growth by-products, as well as other environmentally-friendly compounds, to enhance oil recovery by removing paraffin deposits from a well and providing controlled production of carbon dioxide in the well.

18 Claims, 3 Drawing Sheets

(51) Int. Cl.
    *C09K 8/584*     (2006.01)
    *C09K 8/594*     (2006.01)
    *E21B 37/06*     (2006.01)
    *E21B 43/16*     (2006.01)

(58) Field of Classification Search
    USPC .......................................................... 166/285
    See application file for complete search history.

(56) References Cited

U.S. PATENT DOCUMENTS

| | | | |
|---|---|---|---|
| 3,871,956 | A | 3/1975 | Azarowics |
| 4,369,125 | A | 1/1983 | Kragen et al. |
| 4,450,908 | A | 5/1984 | Hitzman |
| 4,487,262 | A | 12/1984 | Venkatesan et al. |
| 4,522,261 | A | 6/1985 | McInerney et al. |
| 4,561,501 | A | 12/1985 | Shaw et al. |
| 4,793,826 | A | 12/1988 | Hayes et al. |
| 4,905,761 | A | 3/1990 | Bryant |
| 5,156,652 | A | 10/1992 | Gregoli et al. |
| 5,165,477 | A | 11/1992 | Shell et al. |
| 5,284,576 | A | 2/1994 | Weers et al. |
| 5,869,325 | A | 2/1999 | Crabtree et al. |
| 6,033,901 | A | 3/2000 | Powell, Jr. |
| 6,942,037 | B1 | 9/2005 | Arnold et al. |
| 7,472,747 | B1 | 1/2009 | Brigmon et al. |
| 7,677,673 | B2 | 3/2010 | Tranquilla et al. |
| 7,681,638 | B2 | 3/2010 | Soni et al. |
| 8,188,012 | B2 | 5/2012 | Weerasooriya et al. |
| 8,316,933 | B2 | 11/2012 | Kohr |
| 9,422,470 | B2 | 8/2016 | Xu et al. |
| 9,550,937 | B2 | 1/2017 | Campbell et al. |
| 9,683,164 | B2 | 6/2017 | Gunawan et al. |
| 9,725,986 | B2 | 8/2017 | Xu et al. |
| 9,884,986 | B2 * | 2/2018 | Gunawan ................. C23F 1/04 |
| 10,023,787 | B2 | 7/2018 | Benoit et al. |
| 10,190,038 | B2 | 1/2019 | Armstrong et al. |
| 2001/0056047 | A1 | 12/2001 | Meine et al. |
| 2004/0231845 | A1 | 11/2004 | Cooke, Jr. |
| 2007/0092930 | A1 | 4/2007 | Lal et al. |
| 2007/0125536 | A1 | 6/2007 | Acock et al. |
| 2007/0151726 | A1 | 7/2007 | Crews et al. |
| 2008/0167445 | A1 | 7/2008 | Podella et al. |
| 2008/0280789 | A1 | 11/2008 | Welton et al. |
| 2008/0302531 | A1 | 12/2008 | Berger et al. |
| 2009/0029879 | A1 | 1/2009 | Soni et al. |
| 2010/0044031 | A1 | 2/2010 | Fallon et al. |
| 2010/0163230 | A1 | 7/2010 | Kotlar |
| 2011/0139262 | A1 | 6/2011 | Aburto Anell et al. |
| 2011/0290482 | A1 | 12/2011 | Weerasooriya et al. |
| 2012/0037368 | A1 | 2/2012 | Eick et al. |
| 2012/0055685 | A1 | 3/2012 | Sanders et al. |
| 2012/0122740 | A1 | 5/2012 | Roldan Carrillo et al. |
| 2012/0292022 | A1 | 11/2012 | Choban et al. |
| 2013/0020082 | A1 | 1/2013 | Lumsden |
| 2013/0062053 | A1 * | 3/2013 | Kohr ....................... C09K 8/582 166/246 |
| 2013/0264060 | A1 | 10/2013 | De Wolf et al. |
| 2013/0319656 | A1 | 12/2013 | Brownlee |
| 2014/0073541 | A1 | 3/2014 | Ravikiran et al. |
| 2014/0273150 | A1 | 9/2014 | Angel |
| 2014/0305649 | A1 | 10/2014 | Tang et al. |
| 2014/0315765 | A1 | 10/2014 | McDaniel |
| 2014/0332212 | A1 | 11/2014 | Ayers et al. |
| 2014/0360727 | A1 | 12/2014 | Milam et al. |
| 2015/0037302 | A1 | 2/2015 | Bralkowski et al. |
| 2015/0068950 | A1 | 3/2015 | See et al. |
| 2015/0259642 | A1 | 9/2015 | Sangwai et al. |
| 2015/0300139 | A1 | 10/2015 | Armstrong et al. |
| 2016/0002521 | A1 | 1/2016 | Dillon et al. |
| 2016/0145487 | A1 | 5/2016 | Alam et al. |
| 2016/0160111 | A1 | 6/2016 | Smith et al. |
| 2016/0222280 | A1 | 8/2016 | Kohr et al. |
| 2016/0244347 | A1 | 8/2016 | Angel |
| 2016/0251565 | A1 | 9/2016 | Yanagisawa et al. |
| 2016/0333258 | A1 | 11/2016 | Drake et al. |
| 2017/0037301 | A1 | 2/2017 | Alwattari |
| 2017/0044424 | A1 * | 2/2017 | Dwarakanath ........... C09K 8/58 |
| 2017/0138135 | A1 | 5/2017 | Almutairi |
| 2018/0201531 | A1 | 7/2018 | Cohen et al. |
| 2018/0282608 | A1 * | 10/2018 | Gopal ....................... C23G 1/19 |
| 2019/0292436 | A1 | 9/2019 | Mason et al. |
| 2019/0359562 | A1 | 11/2019 | Lyman et al. |

FOREIGN PATENT DOCUMENTS

| | | |
|---|---|---|
| CN | 102925397 A | 2/2013 |
| CN | 103449696 A | 12/2013 |
| CN | 104109646 A | 10/2014 |
| CN | 104974952 A | 10/2015 |
| CN | 105154050 A | 12/2015 |
| CN | 103614131 B | 1/2016 |
| CN | 105753283 A | 7/2016 |
| CN | 108373912 A | 8/2018 |
| GB | 2450204 A | 12/2008 |
| JP | 2010200695 A | 9/2010 |
| JP | 2016000017 A | 1/2016 |
| KR | 101481459 B1 | 1/2015 |
| WO | 2007129332 A1 | 11/2007 |
| WO | 2010011226 A2 | 9/2010 |
| WO | 2013110132 A1 | 8/2013 |
| WO | 2014152350 A1 | 9/2014 |
| WO | 2015093934 A1 | 6/2015 |
| WO | 2015167864 A1 | 11/2015 |
| WO | 2016196680 A1 | 12/2016 |
| WO | 2017040903 A1 | 3/2017 |
| WO | 2017044953 A1 | 3/2017 |
| WO | 2018049182 A2 | 3/2018 |
| WO | 2018107162 A1 | 6/2018 |
| WO | 2018129299 A1 | 7/2018 |
| WO | 201814265 A2 | 8/2018 |
| WO | 2018148397 A3 | 8/2018 |
| WO | 2018160995 A1 | 9/2018 |
| WO | 2018191172 A1 | 10/2018 |
| WO | 2018231791 A1 | 10/2018 |
| WO | 2018237137 A1 | 12/2018 |
| WO | 2019022996 A1 | 1/2019 |
| WO | 2019022998 A1 | 1/2019 |
| WO | 2019046183 A1 | 3/2019 |
| WO | 2019067356 A1 | 4/2019 |
| WO | 2019089730 A1 | 5/2019 |
| WO | 2019094615 A1 | 5/2019 |
| WO | 2019133555 A1 | 7/2019 |
| WO | 2019191296 A1 | 10/2019 |
| WO | 2019200054 A1 | 10/2019 |
| WO | 2019204715 A1 | 10/2019 |
| WO | 2019213055 A1 | 11/2019 |
| WO | 2019222168 A1 | 11/2019 |
| WO | 2020006194 A1 | 1/2020 |
| WO | 2020028253 A1 | 2/2020 |

OTHER PUBLICATIONS

Amosa, M.K., et al., "Sulphide Scavengers in Oil and Gas Industry—A Review." NAFTA, 2010, 61(2): 85-92.

Castaneda, L.C., et al., "Current situation of emerging technologies for upgrading of heavy oils." Catalysis Today, 2014, 220-222: 248-273.

(56) References Cited

OTHER PUBLICATIONS

Das, N., et al., "Review Article Microbial Degradation of Petroleum Hydrocarbon Contaminants: An Overview." Biotechnology Research International, 2011, 2011: 941810, pp. 1-13.
Daverey, A., et al., "Production of sophorolipids by the yeast *Candida bombicola* using simple and low cost fermentative media." Food Research International, 2009, 42: 499-504.
De Almeida, D., et al., "Biosurfactants: Promising Molecules for Petroleum Biotechnology Advances." Frontiers in Microbiology, Oct. 2016, 7(1718): 1-14.
De Brito, D., Biosurfactants from renewable raw materials, Universidade do Minho Departamento de Engenharia Biologica, Nov. 2013, pp. 1-93.
De Oliveira, M., et al., "Review: Sophorolipids a Promising Biosurfactant and it's Applications." International Journal of Advanced Biotechnology and Research, 2015, 6(2): 161-174.
Elshafie, A. E., et al., "Sophorolipids Production by Candida bombicola ATCC 22214 and its Potential Application in Microbial Enhanced Oil Recovery." Frontiers in Microbiology, Nov. 2015, 6(1324): 1-11.
El-Sheshtawy, H.S., et al., "Production of biosurfactants by Bacillus licheniformis and Candida albicans for application in microbial enhanced oil recovery." Egyptian Journal of Petroleum, 2016, 25: 293-298.
Ghojavand, H. et al., "Isolation of thermotolerant, halotolerant, facultative biosurfactant-producing bacteria." Appl. Microbiol. Biotechnol, Oct. 2008, 80(6): Abstract, doi: 10,1007/s00253-008-1570-7.
Gudina, E., et al., "Biosurfactant-producing and oil-degrading Bacillus subtilis strains enhance oil recovery in laboratory sand-pack columns." Journal of Hazardous Materials, 2013, 261: 106-113.
Ines, M., et al., "Glycolipids biosurfactants; potential related biomedical and biotechnical applications." Carbohydrate Research, 2015, 416: 59-69.
Kaur, K., et al., "Biosurfactant production by yeasts isolated from hydrocarbon polluted environments." Environ Monit Assess, 2017, 189 (603: 1-13.
Liu, X., et al., "Recovery of crude oil from oily sludge in an oilfield by sophorolipid." Petroleum Science and Technology, 2019, 37(13): 1582-1588.
Ma, X., et al., "Surface and biological activity of sophorolipid molecules produced by *Wickerhamiella domercqiae* var. sophorolipid CGMCC 1576." Journal of Colloid and Interface Science, 2012, 376: 165-172.
Nur, H.A., et al., "*Saccharomyces cerevisiae* from Baker's Yeast for Lower Oil Viscosity and Beneficial Metabolite to Improve Oil Recovery: An Overview." Applied Mechanics and Materials, 2014, 625: 522-525.
Pacwa-Plociniczak, M. et al., "Review: Environmental Applications of Biosurfactants: Recent Advances." Int. J. Mol. Sci., 2011, 12: 633-654.
Rocha E Silva, F.C.P., et al., "Yeasts and bacterial biosurfactants as demulsifiers for petroleum derivative in seawater emulsions." AMB Expr., 2007, 7(202): 1-13.
Sen, R., "Biosurfactants: Advances in Experimental Medicine and Biology." Landes Bioscience and Springer Science+Business Media, LLC, 2010, 672: 1-331.
Shah, M.U.H., et al., "Production of sophorolipids by *Starmerella bombicola* yeast using new hydrophobic substrates." Biochemical Engineering Journal, 2017, 127: 60-67.
Silva, R., et al., "Applications of Biosurfactants in the Petroleum Industry and the Remediation of Oil Spills." International Journal of Molecular Sciences, 2014, 15: 12523-12542.
Thaniyavarn, J., et al., "Production of Sophorolipid Biosurfactant by Pichia anomala." Bioscience, Biotechnology, and Biochemistry, 2008, 72(8): 2061-2068.
Umar, Z.D., et al., "Rapid biodegradation of polycyclic aromatic hydrocarbons (PAHs) using effective Cronobacter sakazakii MM045 (KT933253)." MethodsX, 2017, 4: 104-117.
Wadekar, S., et al., "Sophorolipid Production by Starmerella bombicola (ATCC 22214) from Virgin and Waste Frying Oils, and the Effects of Activated Earth Treatment of the Waste Oils." J Am Oil Chem Soc, 2012, 89: 1029-1039.
Youssef, N., et al., "In Situ Biosurfactant Production by Bacillus Strains Injected into a Limestone Petroleum Reservoir." Applied and Environmental Microbiology, Feb. 2007, 73(4): 1239-1247.
Zafra, G., et al., "Biodegradation of polycyclic aromatic hydrocarbons by *Trichoderma* species: a mini review." Environ Sci Pollut Res, 2015, 22: 19426-19433.
Santos, D. K. F., et al., "Biosurfactants: Multifunctional Biomolecules of the 21st Century." International Journal of Molecular Sciences, 2016, 17(401): 1-31.

* cited by examiner

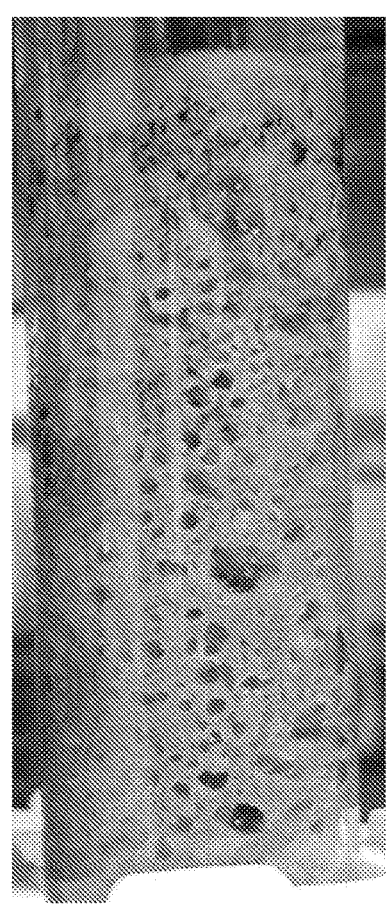
FIG. 3A                   FIG. 3B
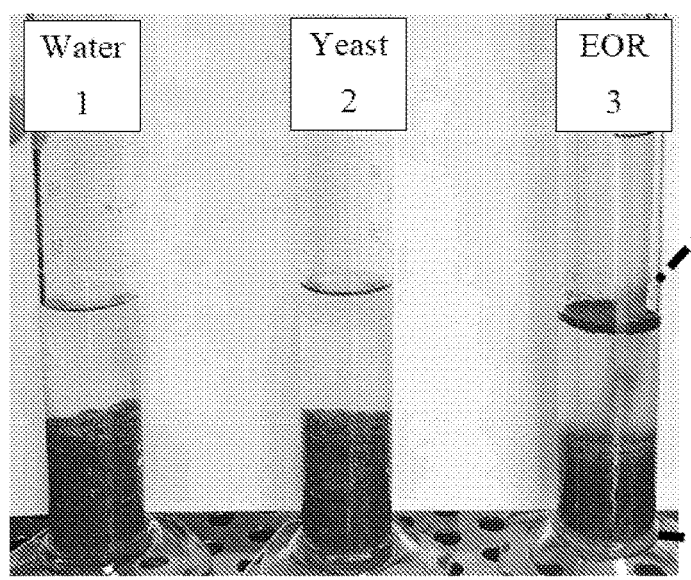
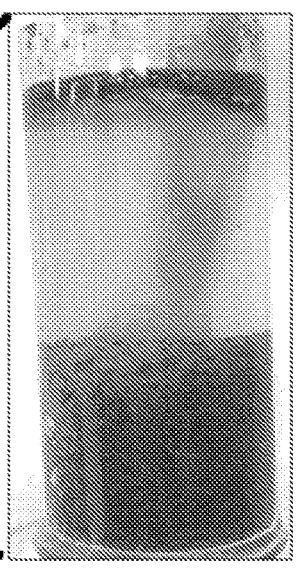
FIG. 4A                   FIG. 4B

METHODS FOR PARAFFIN REMOVAL AND EXTENDED POST-PRIMARY OIL RECOVERY

CROSS-REFERENCE TO RELATED APPLICATION

This application is a National Stage Application of International Application No. PCT/US2019/047186, filed Aug. 20, 2019; which claims priority to U.S. Provisional Patent Application No. 62/719,773, filed Aug. 20, 2018, both of which are incorporated herein by reference in their entirety.

BACKGROUND OF THE INVENTION

The "recoverable reserves" of a particular well are an important measure of how profitable the well will likely be. Reserves are considered recoverable if they are economically and technologically feasible to extract at the existing price of oil and gas. In other words, recoverable reserves are those that can be developed with reasonable certainty under current economic conditions, operating methods and government regulations.

Oil exists in small pores and narrow fissures within the body of reservoir rocks underneath the surface of the earth. Natural pressure of the reservoir causes the oil to flow up to the surface, thereby providing primary production of an oil well. As oil production progresses, however, the reservoir pressure is depleted to a point at which artificial lift or pumping is required to maintain an economical oil production rate. In these situations, the formation may still contain significant amounts of oil, but the decreased formation pressure reduces the flow capacity of the oil out of the wellbore.

When it is necessary to provide external energy for the reservoir to achieve additional oil recovery (secondary oil recovery), there exist technologies for increasing pressure in a reservoir to "push" the remaining oil to the surface. One method involves injecting gas, e.g., carbon dioxide or nitrogen into an oil reservoir, while another method involves injecting water (waterflooding). The effect is a repressurization of the reservoir, causing oil displacement from trapped capillaries and enhancing mobilization of the oil to the producing wells. While these methods can be useful for producing a certain amount of additional oil, the methods are often only successful for a short period of time before it because uneconomical to continue, yet again.

Gas injection, in particular, can be technologically difficult to implement due to the high volumes of immiscible gas needed and the costs and safety concerns related to gas compression and pumping. One solution to these challenges has been the use of gas-producing microorganisms in Microbial Enhanced Oil Recovery (MEOR). MEOR involves the use of specific bacteria to produce, e.g., biogenic gases in situ, which can include carbon dioxide, hydrogen, methane and nitrogen. These gases can help with repressurizing a reservoir, as well as with reduction of oil viscosity by solution of the gas in the oil. Examples of gas-producing bacteria are *Clostridium, Desufovibrio, Pseudomonas*, and some methanogens.

While in situ gas production can be useful in that pumping of gas from the surface is not required, the longer a living microbiome is permitted to develop within a formation, the greater the risk is for the establishment of microorganisms that produce deleterious metabolites. For example, certain bacteria that grow within a formation produce hydrogen sulfide, carbonic acid and/or other corrosive metabolites. Furthermore, biofilms can build up in various structures and processing mechanisms, including shale formation facing, wells, pipes, and tanks. "Biofilms" comprise layers of biomass made up of a compact grouping of microorganisms surrounded by an extracellular matrix of polymeric substances. Biofilms adhere to surfaces of many man-made mechanisms, such as tubes and pipes, and can significantly impair their proper functioning. Additionally, many of the biofilms present in, or on, oil rigs contain sulfate-reducing bacteria that generate potent, and often harmful, chemical byproducts, e.g., hydrogen sulfide.

In addition to biofilms, other problematic deposits can cause further problems in recovering oil and gas from a subterranean formation. Scale deposits can occur during water flooding operations, when mineral salts precipitate as a result of injected water or brine coming into contact with other formation fluids or the formation itself, as well as changes in the pressure, composition and/or temperature of the formation or crude oil. Scales can comprise precipitates of, for example, barium sulfate, barium carbonate, calcium carbonate, strontium carbonate, strontium sulfate, calcium sulfate, sodium chloride, silicon dioxide, iron sulfide, iron oxides, iron carbonate, silicates, phosphates and oxides, or any of a number of compounds that are insoluble or mildly soluble in water.

Scales and other deposits can also lead to structural failure and production inefficiency when they are present in and around the wellbore, tubing, flow lines, storage tanks, separators, and other components of oil and gas production infrastructure, as well as in the pores of the reservoir rock. These other problematic deposits can be formed by, for example, high-molecular-weight constituents of petroleum fluids, most notably, paraffins and asphaltenes, as well as rusts, and bacterial deposits, or biofilms.

Paraffin deposits, in particular, can range from soft accumulations of lighter-molecular-weight paraffins to hard and/or brittle accumulations as the molecular weight of the paraffin increases. Paraffin deposition is primarily a result of a loss in solubility of certain components in the crude oil, which can be caused by a decrease in temperature or pressure in an oil well or formation.

Paraffin that remains entrained in crude oil does not typically cause issues in production. However, when the paraffin particles precipitate and begin to accumulate as solid or semi-solid deposits, the most significant problems related to paraffin occur. Once even a thin layer of paraffin deposit is formed on a surface, the rate of further accumulation drastically increases. As the thickness of deposits increases over time, the result is a gradual decrease in oil production. Thus, prevention of deposition is an important aspect of oil well maintenance. Paraffin inhibitor chemicals, which are typically crystal modifiers, can be used to prevent the deposition of paraffin onto surfaces. Other methods of inhibition, involving plastic coatings on tubulars, and electrical heaters, can be used as well, but are limited by, for example, the cost of installation.

When prevention of paraffin deposition is unfeasible or unsuccessful, systematic removal of deposits is crucial to maintaining properly functioning oil producing facilities. Current methods of deposit removal fall within four main categories: mechanical, chemical, microbial, and thermal removal. Mechanical removal typically involves the use of scrapers or cutters to physically remove deposits. When deposition is too extensive, cutting out and/or total replacement of equipment is often necessary.

Chemical removal involves the use of solvents or surfactants that can solubilize deposits or interfere with their crystallization and formation. Examples of widely-used solvents include benzene, toluene and xylene. With microbial methods, certain strains of bacteria can be used to degrade deposits themselves, or can produce natural biochemicals that do so.

Along with many of these methods, however, thorough removal of deposits often requires the addition of some type of thermal treatment. Thermal removal, with steam, hot water or hot oil, for example, is useful for melting or dissolving deposits, and as noted, for supplementing other methods of removal. This requires high energy inputs, however, and the use of hot steam can be dangerous for workers at the site of application. Furthermore, the liquefaction of paraffin is often only temporary, meaning the paraffin will almost immediately re-solidify due to the properties of the oil and/or the environment.

As noted, certain post-primary oil recovery methods, such as gas injection, can only provide a limited amount of additional oil production. Though removal of deposits such as paraffins and scales can help ease the flow of oil and thus improve oil outputs temporarily, the resulting increase is often short-lived, only lasting for a few additional days.

Because of the billions of gallons of oil that remain unrecovered from oil-bearing formations, there is a need in the art for safe, effective, environmentally-friendly, and economical means for increasing recoverable reserves. Accordingly, there is a need for improved methods of removing problematic deposits from oil and gas wells, formations and equipment, as well as improved methods for enhancing oil recovery for extended periods of time.

BRIEF SUMMARY OF THE INVENTION

The subject invention provides methods of using microbes and their by-products to enhance oil production. Advantageously, the methods and the microbe-based products utilized herein are environmentally-friendly, operational-friendly and cost-effective.

In certain embodiments, the subject invention provides a three-part method for enhancing oil production from an oil well having paraffin deposits therein, wherein the method generally comprises (1) a paraffin removal step; (2) a gas release step; and (3) a plugging step.

While paraffin removal on its own is capable of providing a well with short-term enhanced oil recovery due to, for example, the unclogging of equipment and formation pores, additional steps can be implemented for extending the period of enhanced oil recovery (EOR) by simultaneously employing multiple additional mechanisms of EOR, such as, e.g., repressurization of a subterranean formation using carbon dioxide gas.

In one embodiment, part (1) of the subject method, paraffin removal, comprises applying one or more solvents, one or more surfactants, one or more yeast fermentation products, one or more chelating agents, and, optionally, one or more ammonium salts and/or co-surfactants, to an oil well. Preferably, these components are pre-mixed outside of the well and injected as one liquid composition, which is capable of liquefying or dissolving solid paraffin deposits in the rock pores of subterranean formations, in wells, and in/on equipment, such as, for example, tubing, pipes, drills and tanks associated with all aspects of oil and/or gas production.

Part (1) can also be used to disperse and/or emulsify precipitated paraffin back into crude oil fluids. Advantageously, in one embodiment, the paraffin remains dispersed in the oil and does not re-precipitate. Additionally, in one embodiment, part (1) of the method can be useful to free stuck or floating rods, allowing inoperable wells to resume operation, and can open up clogged channels, thus allowing for improved oil production. Furthermore, part (1) can be useful in removing short- and long-chain paraffin deposits, including those that are particularly difficult to remove due to, for example, the thickness and/or the hardness of the deposit.

In a specific embodiment, part (1) comprises applying to the oil well: a yeast fermentation product comprising cultivated yeasts and/or growth by-products thereof; one or more solvents selected from, for example, terpenes, terpenoids, acetates, ionic or semi-ionic liquids, alcohols, kerosene, gasoline, diesel, benzene, toluene, and xylene; one or more surfactants selected from, for example, glycolipids, lipopeptides, and fatty acid esters; and one or more chelating agents selected from, for example, EDTA, sodium citrate and citric acid. Optionally, one or more ammonium salts and/or co-surfactants are also applied.

In one embodiment, the yeast fermentation product of part (1) of the subject methods comprises a fermentation medium having cultivated *Wickerhamomyces anomalus, Starmerella bombicola*, and/or *Meyerozyma guilliermondii* yeast cells and/or growth by-products thereof, wherein the yeasts are cultivated on a solid or semi-solid fermentation medium selected from high surface-area to volume foodstuffs, such as, e.g., chickpeas, soybeans, rice, or beans. In one embodiment, the yeasts are cultivated using submerged fermentation.

In one embodiment, the solvent(s) and/or the surfactant(s) applied in part (1) can be produced by non-biological means (e.g., chemical isolation, purification and/or synthesis). In another embodiment, the solvents and/or surfactants can be derived from natural or biological sources, such as, for example, the living cells of microorganisms, plants, fungi and/or animals.

In one embodiment, the one or more solvents and the one or more surfactants are, preferably, not produced by the yeasts of the yeast fermentation product.

In certain embodiments, the biosurfactants can be added to the composition in purified form and/or in crude form. In certain embodiments, the biosurfactant can be added to the composition in the form of a microbial culture, e.g., a second yeast fermentation product, containing liquid fermentation broth and cells resulting from submerged cultivation of a biosurfactant-producing microbe, e.g., *Wickerhamomyces anomalus, Starmerella bombicola* or *Meyerozyma guilliermondii*. Preferably, when this "culture form" of biosurfactants is utilized, the microbial fermentation broth comprises 20 to 25% of the total volume of the liquid composition applied in part (1).

In another embodiment, immediately after part (1), or about 60 minutes, 30 minutes, 15 minutes, 10 minutes, 5 minutes, 1 minute or less than 30 seconds after part (1), the subject method comprises part (2), gas release, for extended enhanced oil recovery, where the amount of oil recovered per day can be increased by, for example, 200 to 300% for 10 to 15 days or more (in addition to the enhanced oil production that is achieved through paraffin removal).

Advantageously, part (2) employs multiple mechanisms of EOR, including, for example, repressurization of the oil- and/or gas-bearing formation associated with a well, the reduction of interfacial tension in the formation, and the increase of formation permeability through dissolution of scale and solubilization of carbonate rock.

In a specific embodiment, part (2) comprises pre-mixing one or more chelating agents, a biosurfactant, a carbonate salt and water, outside of the well under basic conditions (i.e., a pH adjuster is added) to produce a basic composition. This basic composition is injected into the well and mixed in situ with an acid solution. The reaction with the acid solution produces gases that repressurize the formation and increase the flow of oil out of the formation In preferred embodiments, the chelating agent in (2) is EDTA, the biosurfactant is a glycolipid, such as an acidic form sophorolipid (SLP), the carbonate salt is sodium bicarbonate (baking soda), and the pH adjuster is a base, such as sodium hydroxide (NaOH).

In an exemplary embodiment, the basic composition comprises 15 to 25 g/L of EDTA, 5 to 15 g/L of the glycolipid, 90 to 110 g/L of the sodium bicarbonate, and enough sodium hydroxide to completely dissolve the EDTA and bring the pH of the composition to 9.5 or greater.

In certain embodiments, the acid is injected into the well either immediately prior to or immediately after injection of the basic composition. In one embodiment, the acid solution is 25 to 35% citric acid. The time in between application of the basic composition and the acid solution can be, for example, 5 minutes or less, 2 minutes or less, or even 30 seconds or less.

Part (2) can further comprise injecting water and/or brine into the well to push the basic composition and acid solution into the formation. Preferably, the injection of water and/or brine is performed immediately (e.g., within 5 minutes or less) after the release of gas.

The amount of acid solution injected into the well can vary depending upon the amount of basic composition that is injected and the acidity of the brine. In one embodiment, the amount of acid solution is an amount sufficient to reduce the pH of the basic composition to 7.0 or below, preferably 6.0 or below, which will activate the release of carbon dioxide gas. In another embodiment, no acid solution is injected, for example, when the brine has an acidic pH (e.g., pH of 2 to 3 or lower) that is sufficient to reduce the pH to 7.0 or lower, preferably, 6.0 or lower.

The subject methods can further comprise part (3), wherein a plugging composition is injected into the well immediately after part (2) to help with gas and pressure buildup, as well as improve flow of oil from the formation. In one embodiment, the plugging composition comprises 1.0-1.5% sodium alginate dissolved in water. The plugging composition can also comprise a biopolymer, such as xanthan gum or guar gum.

In one embodiment, the plugging composition is preferably in liquid form upon injection, but solidifies when it comes into contact with salts present in the brine and formation. The plugging composition will selectively plug larger pores and channels with some non-selective plugging of smaller pores. Over time, the plugging composition will wash out on its own throughout the oil production process; however, if desired, the plugging composition can be deliberately washed out using known methods.

In one embodiment, after completion of part (3) of the subject method, the well can be shut in for a number of hours or days, depending on, for example, the time it takes for carbon dioxide gas to be released, which can depend upon, for example, the porosity of the formation. Preferably, the shut-in time for the subject methods ranges from 8 hours to 30 days, preferably from 12 hours to 3 days, or 24 hours.

Once carbon dioxide production stops, pumping of oil from the formation can resume after about one or two days.

In one embodiment, the subject methods can be used alongside and/or to enhance existing microbial treatments and/or chemical treatments, such as, for example, non-biological surfactants, condensates, and/or solvents. In a specific embodiment, the subject compositions and methods can be used alongside treatments with solvents such as benzene, toluene and/or xylene.

In certain embodiments, the methods are used for improving, enhancing, and/or maintaining oil production from and operation of, for example, subterranean formations, oil and/or gas wells, boreholes, tubes, pipes, drills, tanks and other structures and equipment involved in oil and/or gas production, transportation, storage and refining. The subject invention can be used in, for example, vertical, horizontal and/or fracking wells, mature wells, stripper (marginal) wells, flowlines, and to clean storage tanks.

Advantageously, the present invention can be used without releasing large quantities of inorganic compounds into the environment. Additionally, the compositions and methods utilize components that are biodegradable and toxicologically safe. Thus, while the subject invention can be used to, for example, supplement or enhance other existing methods of paraffin removal and enhanced oil recovery, the present invention can also be used on its own as an environmentally-friendly treatment.

BRIEF DESCRIPTION OF THE FIGURES

FIGS. 3A-3B show the difference between aged sands treated with a standard MEOR treatment (3A) versus sands treated with a basic composition according to part (2) of the subject methods (3B). The sands treated with the basic composition (3B) produced more carbon dioxide gas, as can be seen with the pockets of air that formed in the sand.

FIGS. 4A-4B show a comparative study of carbon dioxide release from three different treatments of aged sand in test tubes, shown side-by-side in 4A. The first treatment was a water control, the second treatment was a yeast MEOR product, and the third treatment (magnified in 4B) was a basic composition according to part (2) of the subject methods. After the addition of citric acid to the tubes, carbon dioxide bubbles immediately released from the sands in the third test tube and continued releasing past 4.5 hours.

DETAILED DESCRIPTION

Figure 1:
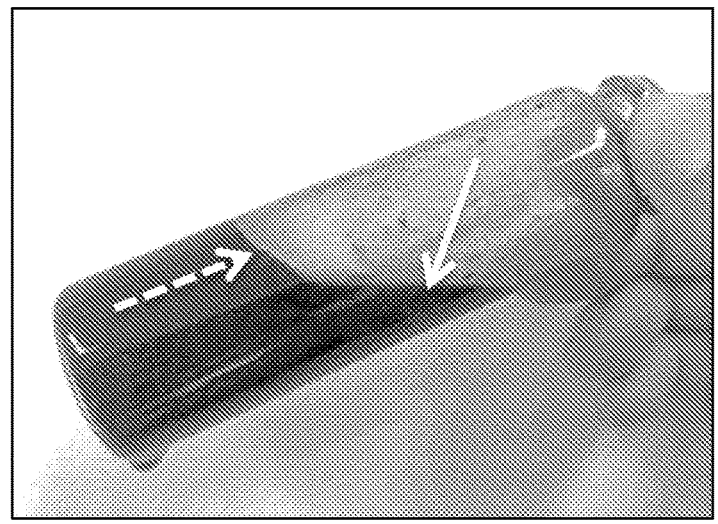
FIG. 1 shows pour point test tube treatment of paraffin according to part (1) of the subject methods. The bottom of the test tube contains a sold paraffin portion (denoted by the dashed arrow), which became solid at −3° C. and did not flow upon tilting the test tube. D-limonene and canola oil separated from the solution while the mixture was being chilled and remained liquid (denoted by the solid arrow).

The subject invention provides methods of using microbes and their by-products to enhance oil production. Advantageously, the methods and the microbe-based products utilized therein are environmentally-friendly, operational-friendly and cost-effective.

In certain embodiments, the subject invention provides a three-part method for enhancing oil production from an oil well having paraffin deposits therein, wherein the method generally comprises (1) a paraffin removal step; (2) a gas release step; and (3) a plugging step.

The methods of the subject invention utilize multiple mechanisms of enhanced oil recovery to provide increased oil production for extended periods of time, e.g., two weeks or more. These mechanisms include paraffin liquefaction and dispersal; repressurization of an oil-bearing formation; reduction of interfacial tension in the formation; and increase of formation permeability through dissolution of scale and solubilization of carbonate rock. Advantageously, the subject invention can be used to increase the recoverable reserves in a subterranean formation.

Selected Definitions

As used herein, a "biofilm" is a complex aggregate of microorganisms, such as bacteria, wherein the cells adhere to each other and/or to a surface using an extracellular polysaccharide matrix. The cells in biofilms are physiologically distinct from planktonic cells of the same organism, which are single cells that can float or swim in liquid medium.

As used herein, "contaminant" refers to any substance that causes another substance or object to become fouled or impure. Contaminants can be living or non-living and can be inorganic or organic substances or deposits. Furthermore, contaminants can include, but are not limited to, hydrocarbons, such as petroleum, tar sands or asphaltenes; fats, oils and greases (FOG), such as cooking grease and lard; lipids; waxes, such as paraffin; resins; biofilms; or any other substances referred to as, for example, dirt, dust, scale, sludge, crud, slag, grime, scum, plaque, buildup, or residue. In preferred embodiments of the subject invention, the contaminant is paraffin, rust, biofilm and/or scale.

As used herein, the term "enhanced oil recovery, or "EOR," refers to post-primary recovery of oil from an oil-bearing subterranean formation. Various methods can be utilized in EOR, including, for example, microorganisms, gas and/or water injection and plugging, to increase the movement of oil and/or gas from a formation. EOR can also include well stimulation.

A "metabolite" refers to any substance produced by metabolism (e.g., a growth by-product) or a substance necessary for taking part in a particular metabolic process. A metabolite can be an organic compound that is a starting material, an intermediate in, or an end product of metabolism. Examples of metabolites include, but are not limited to, enzymes, acids, solvents, gasses, alcohols, proteins, vitamins, minerals, microelements, amino acids, biopolymers, and biosurfactants.

As used herein, reference to a "microbe-based composition" means a composition that comprises components that were produced as the result of the growth of microorganisms or other cell cultures. Thus, the microbe-based composition may comprise the microbes themselves and/or by-products of microbial growth. The by-products of growth may be, for example, metabolites, including surfactants and proteins, cell membrane components, and/or other cellular components. The microbes may be intact or lysed. The cells may be absent or present at, for example, a concentration of at least $1\times10^4$, $1\times10^5$, $1\times10^6$, $1\times10^7$, $1\times10^8$, $1\times10^9$, $1\times10^{10}$, or $1\times10^{11}$, $1\times10^{12}$ or more CFU/milliliter of the composition. Furthermore, the cells may be separated, i.e., removed, from the broth in which they were cultivated such that the composition comprises cell-free broth with cellular growth by-products.

The subject invention further provides "microbe-based products," which are products that are to be applied in practice to achieve a desired result. The microbe-based product can be simply the microbe-based composition harvested from the microbe cultivation process. Alternatively, the microbe-based product may comprise further ingredients that have been added. These additional ingredients can include, for example, stabilizers, buffers, appropriate carriers, such as water, salt solutions, or any other appropriate carrier, added nutrients to support further microbial growth, non-nutrient growth enhancers, and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

As used herein, "permeability" of a porous rock formation is the measure of the ability of fluid to pass through the rock. Permeability is measured in darcies (D), wherein 1 D is the permeability of a porous medium with a cross-sectional area of 1 cm$^2$ and a length of 1 cm, through which the passage of 1 cm$^3$ of fluid with viscosity of 1 ep, flows in 1 second under a pressure differential of 1 atm. Permeability depends upon the porosity of a formation (the higher the porosity the higher the permeability) and the connectivity of the pore spaces. The size and shape of grains, the grain size distribution, and other factors such as the wetting properties of the rock and the presence of pore-blocking deposits can also influence permeability. Permeability can vary from 1 nanodarcy (nD) to 1 microdarcy (mD) for granites, shales and clays, to several D for extremely permeable reservoir rocks. Reservoir permeability can be classified as low or fair (<10 mD), high (10-100 mD), very high (100-1,000 mD), and exceptional (>1,000 mD), where rock with permeability of 1 mD or less is not considered reservoir rock unless subjected to manipulation (e.g., through fracking).

As used herein, a "stripper well" or "marginal well" refers to a mature or depleted oil well that is nearing the end of its economically useful life. Marginal oil wells are generally characterized in that their daily production of crude oil has dropped to between 10 and 15 barrels per day, or less, for any twelve-month period. These wells often go abandoned prematurely, leaving behind hundreds or even thousands of barrels of valuable and useful crude oil.

As used herein, "surfactant" refers to a compound that lowers the surface tension (or interfacial tension) between a liquid and a gas, between two liquids or between a liquid and a solid. Surfactants can act as, for example, detergents, wetting agents, emulsifiers, foaming agents, and/or dispersants. A surfactant produced by microorganisms is referred to as a "biosurfactant."

As used herein, an "isolated" or "purified" nucleic acid molecule, polynucleotide, polypeptide, protein or organic compound, such as a small molecule, is substantially free of other compounds, such as cellular material, with which it is associated in nature. A purified or isolated polynucleotide (ribonucleic acid (RNA) or deoxyribonuleic acid (DNA)) is free of the genes or sequences that flank it in its naturally-occurring state. A purified or isolated polypeptide is free of other molecules, or the amino acids that flank it, in its naturally-occurring state.

As used herein, reference to an isolated microbe strain means that the strain is removed from the environment in which it exists in nature. Thus, the isolated strain may exist as, for example, a biologically pure culture, or as spores (or other forms of the strain) in association with a carrier.

In certain embodiments, purified compounds are at least 60% by weight the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19 and 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein, "reduces" means a negative alteration of at least 1%, 5%, 10%, 25%, 50%, 75%, or 100%.

As used herein, "reference" means a standard or control condition.

As used herein, "removal" as used in the context of contaminants or fouling means elimination or reduction of contaminants from a surface, a space or a piece of equipment. Removal can include, for example, purifying, defouling, decontaminating, cleaning, clearing or unclogging, and can be achieved by any means, including but not limited to, liquefying, dissolving, melting, scraping, degrading, blasting, soaking, or cleaving the contaminant. In some embodiments, removal can also include controlling, inhibiting or preventing further fouling or contamination from occurring.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention. Use of the term "comprising" contemplates other embodiments that "consist" or "consist essentially" of the recited component(s).

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

All references cited herein are hereby incorporated by reference in their entirety.

Methods of Enhanced Oil Recovery

The subject invention provides materials and methods for improving oil and/or gas production from a well using microbes and their by-products. As used herein, reference to a well also includes the wellbore, subterranean oil-bearing formation, and/or other equipment associated therewith that is involved in the process of recovering oil and/or natural gas. Advantageously, use of the subject invention can improve and/or enhance oil well production, increase recoverable reserves, aid in well stimulation, and restore the health (e.g., production capacity) of under-producing, mature or even dead wells.

In certain embodiments, the subject invention provides a three-part method for enhancing oil production from an oil and/or gas well having paraffin deposits therein, wherein the method generally comprises (1) a paraffin removal step; (2) a gas release step; and (3) a plugging step. Each of these steps comprises applying a certain composition to the well in a particular order to achieve EOR for extended periods of time.

As used herein, "applying" a composition or product refers to contacting it with a target or site such that the composition or product can have an effect on that target or site. The effect can be due to, for example, the individual ingredients of the subject compositions and/or a synergistic combination thereof. There are multiple ways that the method may be implemented using a composition according to the subject invention, for example, the compositions can be injected into oil wells and/or the piping, tubulars, casing, annulus, pumps, and tanks associated with oil-bearing formations, oil wells, oil production, oil transmission and oil transportation.

Application of the composition can be performed during drilling operations (e.g., while drilling, while tripping-in or tripping-out of the hole, while circulating mud, while casing, while placing a production liner, and/or while cementing, etc.). Application can also occur as a production treatment, for example, by introducing the composition into an oil well after oil production is underway and/or after a decline in the rate of oil production from the formation has occurred. In some embodiments, production is halted during treatment with the subject methods.

The volume of treatment used can be determined taking into account, for example, formation porosity, permeability and deposit thickness. In some embodiments, the treatment can produce effects in less than 24 hours of shut-in time.

In one exemplary embodiment, the methods comprise pumping, for example, 100 to 1,000 gallons of more of a composition into and out of an oil well. Injection rates can be determined by a skilled oil well operation, although, as an example, an injection rate of 1 to 20 gallons per minute, or 1 to 20 barrels per minute can be used in some embodiments.

In one exemplary embodiment, the methods comprise applying between about 100-1,000 gallons, or 200 to 600 gallons of a composition into the annulus between the tubing and casing, where it can flow through the pump and into the tubing.

In some embodiments, a composition can be introduced into the formation through perforations in the casing. The composition may be forced into the surrounding formation by applied pressure or, if the composition is allowed to set at the bottom of the casing, the composition may seep into the formation without additional pressure. The composition permeates the formation, improving the rate of oil recovery by a number of mechanisms such as, for example, dissolving paraffin and other contaminant blockages in the formation pore throats.

A composition may be introduced by means of injection pumps into off-shore gas or oil wells to reduce contaminants in well casings and transmission lines. In addition to the problems associated with land oil wells, the lines and contents between the bottom of the ocean and the platform associated with off-shore wells are cooled by the ocean or sea water, thus increasing the crystallization and deposition rate of scale, paraffin and asphaltene. To treat the lines, from 1-500 gallons up to 1000 barrels, 10,000 barrels, or more, for example, of the composition can be introduced therein.

In additional embodiments, a composition may be applied directly to equipment. For example, prior to placing rods and casings into wells, these parts may be sprayed with, or soaked in, the composition. The parts may be dipped into tanks filled with the composition to prevent corrosion and buildup of contaminants.

The subject treatment can be effective in a range of different geologic formations. For example, the subject invention can be useful in formations as deep as about 7,000 feet or deeper, and as shallow as about 1,500 feet or shallower. Additionally, the invention can be useful in formations having ranges of porosity and/or permeability. In some embodiments, the formation has fair or low permeability, such as that found in diatomite formations, or is heterogeneous with certain areas of fair or low permeability, e.g., 10 mD or lower.

The invention can also be useful in formations having a wide range of temperatures, pH, and salinity. For example, subject invention can be utilized in recovery and transport of oil in locations where lower temperatures might cause paraffin deposition, such as, for example, in offshore wells, in the arctic or Antarctic, and in climates that experience cold winter temperatures.

Furthermore, the subject methods can be utilized in oil wells with high formation water salinity levels, for example, in geologic regions where formation water salinity is up to 250,000 ppm (total dissolved solids), up to 300,000 ppm, or even up to 400,000 ppm or more.

Part (1)

The subject invention can be used to enhance oil and/or gas recovery by, for example, removing paraffins and other contaminants from wells, subterranean formations and production equipment that might, for example, obstruct or slow the flow of oil and/or gas.

There are many types of contaminants associated with oil and gas processing equipment, such as oils, paraffins, asphalts/asphaltenes, scales, resins, sulfur, tar by-products, rust, biofilms, and other viscous materials. Part (1) of the subject methods can be used to remove any one or more of the contaminants associated with oil and/or gas recovery, transmission and processing. In preferred embodiments, however, the contaminant is paraffin.

In one embodiment, part (1) of the subject method, paraffin removal, comprises applying one or more solvents, one or more surfactants, one or more yeast fermentation products, one or more chelating agents, and, optionally, one or more ammonium salts and/or co-surfactants, to an oil well. Preferably, these components are pre-mixed outside of the well and injected as one liquid composition, which is capable of liquefying or dissolving solid paraffin deposits in the rock pores of subterranean formations, in wells, and in/on equipment, such as, for example, tubing, pipes, drills and tanks associated with all aspects of oil and/or gas production.

Part (1) can also be used for recovery of economically valuable paraffin hydrocarbons by dispersing and/or emulsifying the dislodged paraffin back into crude oil fluids. Advantageously, applying the subject composition helps inhibit paraffin crystallization and deposition, and helps prevent re-crystallization and re-deposition of dispersed paraffins while pumping and transporting. The methods are even effective at keeping the paraffins suspended/emulsified in the crude oil fluids at temperatures less than 90° C., less than 50° C., less than 25° C., and even less than 0° C., for example from −3° C. to −32° C.

The subject methods can also be useful for a multitude of other benefits related to oil and gas recovery, including, for example: inhibition of paraffin crystallization and prevention of paraffin deposition; reduction in viscosity of paraffinic crude oil; reduction in pour point of paraffinic crude oil (e.g., to about −25° F./−32° C.); removal and/or dissolution of scale; release of rust from oilfield casings and related equipment; protection against under-deposit rust-related corrosion of equipment; inhibition of bacterial growth and disruption of biofilm formation on equipment; protection against microbial- and acid-induced corrosion (MIC); alteration of the wettability of the near-wellbore surface to water-wet; and remediation of formation skin damage.

Additionally, in one embodiment, part (1) of the method can be useful to free stuck or floating rods, allowing inoperable wells to resume operation, and can open up clogged channels, thus allowing for improved oil production. Furthermore, part (1) can be useful in removing short- and long-chain paraffin deposits, including deposits that are particularly difficult to remove due to, for example, the complexity of the paraffin composition, the thickness or the deposit and/or the hardness of the deposit.

In a specific embodiment, part (1) of the subject method, paraffin removal, comprises applying one or more solvents, one or more surfactants, one or more yeast fermentation products, one or more chelating agents, and, optionally, one or more ammonium salts and/or co-surfactants, to an oil well. Preferably, these components are pre-mixed outside of the well and injected as one liquid mixture, which is capable of liquefying or dissolving solid paraffin deposits in the rock pores of subterranean formations, in wells, and in/on equipment, such as, for example, tubing, pipes, drills and tanks associated with all aspects of oil and/or gas production.

In one embodiment, the solvent(s) and/or the surfactant(s) can be produced by non-biological means (e.g., chemical isolation, purification and/or synthesis). In another embodiment, the solvents and/or surfactants can be derived from natural or biological sources, such as, for example, the living cells of microorganisms, plants, fungi and/or animals.

In one embodiment, a first yeast fermentation product for use according to part (1) that comprises a yeast strain and/or by-products produced during cultivation of the yeast. In one embodiment, the microbe is a yeast or fungus, such as, for example, *Wickerhamomyces anomalus* (*Pichia anomala*), *Starmerella bombicola* or *Meyerozyma guilliermondii* (*Pichia guilliermondii*). In certain embodiments, the yeasts are inactivated, for example, using thermal inactivation, prior to being added to the subject composition.

In an exemplary embodiment, a first yeast fermentation product, designated as "Star 3+," can be obtained via cultivation of a yeast, e.g., *Wickerhamomyces anomalus*, using a modified form of solid state fermentation. The culture can be grown on a substrate with ample surface area onto which the yeasts can attach and propagate, such as, for example, corn flour, rice, soybeans, chickpeas, pasta, oatmeal or beans. The culture can be washed out and used in liquid form, or blended with the solid substrate, milled and/or micronized, and optionally, dried. This comprises the Star 3+ product. The product can be diluted in water and/or brine fluids, for example, at least 5, 10, 100, 500 or 1,000 times prior to being added to the composition.

In an alternative embodiment, the first yeast fermentation product is obtained using submerged fermentation, wherein the first yeast fermentation product comprises liquid broth and, optionally, cells and any yeast growth by-products resulting from the submerged fermentation.

The subject method further comprises applying one or more solvents to the well to aide in, for example, dissolving and dispersing paraffins. These can include, for example, acetates, ionic liquids, terpenes, alcohols, and any combination of these.

Preferably, the one or more solvents are not produced by the yeasts of the yeast fermentation product, meaning they are applied in addition to any solvents that may be produced by the yeast of the first yeast fermentation product.

Examples of solvent(s) that can be utilized according to the subject invention include, but are not limited to, terpenes, terpenoids, alcohols, ionic or semi-ionic liquids, acetates, aliphatic and/or aromatic hydrocarbons, olefins, esters, oxygenates, ketones, acetic acid, kerosene, gasoline, diesel, benzene, ethyl benzenes, propyl benzenes, butyl benzenes, toluene, ethyl toluenes, xylene, pentane, alkylene amines, dioxane, carbon disulfide, mesitylene, cumene, cymenes, saturated aliphatic and/or alicyclic hydrocarbons, naphtha, naphthenes, cyclohexane, decalin, tetralin, heptane, octane, cyclooctane, isooctane, cycloheptane, turpentine, carbon tetrachloride, ether alcohol, pinene, dialkyl ether and/or any combination thereof.

In one embodiment, the one or more solvents are non-polar aromatic solvents. In one embodiment, the solvents can include one or more of, for example, terpenes, terpenoids, acetates, ionic or semi-ionic liquids, alcohols, kerosene, gasoline, diesel, benzene, toluene, and/or xylene.

In certain embodiments, the solvents can comprise one or more acetates. In one embodiment, the acetates are naturally-derived. In preferred embodiments, the acetates include isoamyl acetate and/or primary amyl acetate. The acetate(s) can be applied at a concentration of about 10 ml/L to 200 ml/L, about 20 ml/L to 175 ml/L, about 30 ml/L to 150 ml/l, about 40 ml/L to 125 ml/L, or about 50 ml/L to 100 ml/L.

In certain embodiments, the solvents can comprise one or more terpenes and/or terpenoids. In some embodiments, the terpenes or terpenoids are derived from plants, such as citrus plants or pine trees. Terpenes and terpenoids can include but are not limited to, limonenes, orange terpenes, lemon terpenes, grapefruit terpenes, orange oil, lemon oil, other citrus terpenes, other citrus oils, geraniol, terpineol, dipentene, myrcene, linalool, cymene and pinene.

In a preferred embodiment, the terpenes and/or terpenoids include turpentine, D-limonene and/or dipentene at a concentration of about 1.0% to about 10.0% by weight, or about 2.0% to about 8.0% by weight. In one embodiment, the concentration of turpentine, D-limonene and/or dipentene applied is about 10 ml/L to 200 ml/L, about 20 ml/L to 175 ml/L, about 30 ml/L to 150 ml/l, about 40 ml/L to 125 ml/L, or about 50 ml/L to 100 ml/L.

In certain embodiments, the solvents can comprise one or more alcohols, such as, for example, ethanol, methanol, propanol, isopropyl alcohol and/or hexanol. In one embodiment, the alcohols are hexanol and/or isopropyl alcohol, at a concentration of about 1 ml/L to 200 ml/L, about 2 ml/L to 175 ml/L, about 3 ml/L to 150 ml/l, or about 4 ml/L to 100 ml/L.

In certain embodiments, the solvents can comprise one or more ionic or semi-ionic liquids. Exemplary ionic or semi-ionic liquids suitable for the subject composition include, but are not limited to, ethyl ammonium nitrate, and/or a semi-ionic mixture of glycerin/glycerol with magnesium sulfate heptahydrate ($MgSO_4.7H_2O$). In one embodiment, the mixture of glycerol and Epsom salt ($MgSO_4.7H_2O$) has a ratio of glycerol to Epsom salt of 1:1 to 1:10, or from 1:1 to 10:1.

In some embodiments, the ionic or semi-ionic liquid can act as a co-solvent and can prevent the formation of ring bonds in hydrocarbon compositions, which is one cause of hydrocarbon precipitation.

In one embodiment, the ionic or semi-ionic liquid is applied at a concentration of about 10 ml/L to 200 ml/L, about 20 ml/L to 175 ml/L, about 30 ml/L to 150 ml/l, about 40 ml/L to 125 ml/L, or about 50 ml/L to 100 ml/L.

In one embodiment, part (1) of the method comprises applying one or more surfactants, which, along with paraffin removal and/or dispersal, can provide additional enhanced oil recovery due to, for example, their surface and interfacial tension reduction properties.

The surfactant(s) can be of non-biological origin and/or they can be biosurfactants, meaning surfactants produced by a living cell. Non-biological surfactants can be selected from, for example, anionic, cationic, zwitterionic and/or nonionic classes of surfactants.

In certain embodiments, the surfactants are microbial biosurfactants or a blend of more than one type of biosurfactant. Biosurfactants are a structurally diverse group of surface-active substances produced by microorganisms. Biosurfactants are biodegradable and can produced using selected organisms in or on renewable substrates.

All biosurfactants are amphiphiles. They consist of two parts: a polar (hydrophilic) moiety and non-polar (hydrophobic) group. Due to their amphiphilic structure, biosurfactants increase the surface area of hydrophobic water-insoluble substances, increase the water bioavailability of such substances, and change the properties of bacterial cell surfaces. Furthermore, biosurfactants accumulate at interfaces, and reduce the surface and interfacial tension between the molecules of liquids, solids, and gases, thus leading to the formation of aggregated micellar structures in solution.

Biosurfactants according to the subject invention include, for example, low-molecular-weight glycolipids, lipopeptides, fatty acid ester compounds, fatty acid ether compounds, flavolipids, phospholipids, and high-molecular-weight polymers/biopolymers such as lipoproteins, lipopolysaccharide-protein complexes, and/or polysaccharide-protein-fatty acid complexes. Preferably, the biosurfactants are produced by microorganisms In one embodiment, the biosurfactants can comprise one or more glycolipids such as, for example, rhamnolipids, rhamnose-d-phospholipids, trehalose lipids, trehalose dimycolates, trehalose monomycolates, mannosylerythritol lipids, cellobiose lipids, ustilagic acid and/or sophorolipids (including lactonic and/or acidic forms).

In an exemplary embodiment, the surfactant is a mannosylerythritol lipid (MEL), comprising either 4-O-B-D-mannopyranosyl-meso-erythritol or 1-O-B-D-mannopyranosyl-meso-erythritol as the hydrophilic moiety, and fatty acid groups and/or acetyl groups as the hydrophobic moiety. One or two of the hydroxyls, typically at the C4 and/or C6 of the mannose residue, can be acetylated. Furthermore, there can be one to three esterified fatty acids, from 8 to 12 carbons or more in chain length.

MEL molecules can be modified, either synthetically or in nature. For example, MEL can comprise different carbon-length chains or different numbers of acetyl and/or fatty acid groups.

MEL molecules and/or modified forms thereof according to the subject invention can include, for example, tri-acylated, di-acylated, mono-acylated, tri-acetylated, di-acetylated, mono-acetylated and non-acetylated MEL, as well as stereoisomers and/or constitutional isomers thereof.

In certain specific embodiments, the MEL molecules are selected from members of the following groups: MEL A (di-acetylated), MEL B (mono-acetylated at C4), MEL C (mono-acetylated at C6), MEL D (non-acetylated), tri-acetylated MEL A, tri-acetylated MEL B/C, and further including all possible isomers of the members of these groups.

Other MEL-like molecules that exhibit similar structures and similar properties, can also be produced according to the subject invention, e.g., mannosyl-mannitol lipids (MML), mannosyl-arabitol lipids (MAL), and/or mannosyl-ribitol lipids (MRL).

In one embodiment, the biosurfactants can comprise one or more lipopeptides, such as, for example, surfactin, iturin, fengycin, arthrofactin, viscosin, amphisin, syringomycin, and/or lichenysin.

In one embodiment, the biosurfactants can comprise one or more other types of biosurfactants, such as, for example, cardiolipin, emulsan, lipomanan, alasan, and/or liposan.

In one embodiment, the surfactants can comprise one or more microbial-produced fatty acid ester compounds having physical properties and/or behaviors similar to those of biosurfactants, but which are not commonly known as biosurfactants.

In certain embodiments, the fatty acid ester compounds can be represented by the following formula:

wherein
Z=O
$R_1$=$C_6$ to $C_{22}$ saturated or unsaturated hydrocarbon, or an epoxide, or cyclopropane thereof
$Y_1$=H, $C_1$-$C_5$ hydrocarbon, or hydroxyl at any position along $R_1$
$Y_2$=H, $C_1$-$C_5$ hydrocarbon, or hydroxyl at any position along $R_1$
$Y_3$=H, $C_1$-$C_5$ hydrocarbon, or hydroxyl at any position along $R_2$
$Y_4$=H, $C_1$-$C_5$ hydrocarbon, or hydroxyl at any position along $R_2$
$R_2$=$C_1$-$C_{10}$ saturated or unsaturated, branched or unbranched, hydrocarbon.

In certain embodiments, the fatty acid ester compounds can include, for example, highly esterified oleic fatty acids, such as oleic fatty acid ethyl esters and/or oleic fatty acid methyl esters (FAME).

In one embodiment, the biosurfactants can be applied in a crude and/or purified form. In one embodiment, the concentration of biosurfactant applied is about 10 ml/L to 200 ml/L, about 25 ml/L to 175 ml/L, about 30 ml/L to 150 ml/l, about 40 ml/L to 125 ml/L, or about 50 ml/L to 100 ml/L.

In preferred embodiments, the surfactant concentration is no lower than critical micelle concentration (CMC) at the time of application into the formation (e.g., after natural dilution occurs within the formation). Such concentration can be calculated by the skilled artisan having the benefit of the subject disclosure.

The biosurfactants can be present as a growth by-product of a cultivated yeast, although preferably, they are included in addition to any biosurfactants that may happen to be present as growth by-products in the first yeast fermentation product.

In certain embodiments, the biosurfactant can be applied in the form of a microbial culture, e.g., a second yeast fermentation product, containing liquid fermentation broth and cells resulting from submerged cultivation of a biosurfactant-producing microbe, e.g., *Wickerhamomyces anomalus, Starmerella bombicola* or *Meyerozyma guilliermondii*. In certain embodiments, the second yeast fermentation is not produced using the same yeast as the first yeast fermentation product.

In a specific embodiment, when the biosurfactant is a sophorolipid (SLP), a second yeast fermentation product comprising fermentation broth with *Starmerella bombicola* yeast cells and SLP therein, can be applied to the formation. The fermentation broth after, for example, 5 days of cultivation at 25° C., can contain the yeast cell suspension and, for example, 150 g/L or more of SLP.

The yeast cells may be active or inactive at the time of application. When lower concentrations of SLP are desired, the SLP portions of the culture, which forms a distinct layer in the culture, can be removed, and the residual liquid having, for example, 1-4 g/L residual SLP and, optionally, yeast cells and other growth by-products, can be utilized in the subject methods. When use of another biosurfactant is desired, a similar product is envisioned that utilizes any other microbe capable of producing the other biosurfactant.

In one embodiment, the amount of the second yeast fermentation product applied is about 15 to 25% of the total composition by volume, preferably about 20% of total volume.

In one embodiment, the surfactants are obtained through cultivation of microorganisms using processes ranging from small to large scale. The cultivation process can be, for example, submerged cultivation, solid state fermentation (SSF), and/or a combination thereof.

In some embodiments, certain fungi, other than yeasts, have cell walls containing advantageous properties. Accordingly, fermentation products comprising non-yeast fungi can also be used according to the subject invention.

In one embodiment, part (1) of the subject methods further comprises applying one or more chelating agents. As used herein, "chelator" or "chelating agent" means an active agent capable of removing a metal ion from a system by forming a complex so that the metal ion, for example, cannot readily participate in or catalyze oxygen radical formation.

Examples of chelating agents suitable for the present invention include, but are not limited to, dimercaptosuccinic acid (DMSA), 2,3-dimercaptopropanesulfonic acid (DMPS), alpha lipoic acid (ALA), thiamine tetrahydrofurfuryl disulfide (TTFD), penicillamine, ethylenediaminetetraacetic acid (EDTA), sodium acetate, sodium citrate and citric acid.

In one embodiment, the chelating agent is selected from EDTA, citric acid, citrate, sodium acetate, or a mixture thereof. The chelating agent or mixture thereof can be applied in concentrations of about 1 g/L to about 50 g/L, or about 5 g/L to about 25 g/L, or about 10 g/L to about 15 g/L. In specific embodiments, the chelating agent is sodium citrate.

The mixture of components applied to the formation in part (1) of the subject method can be suspended in one or more carriers (e.g., water, oil and/or brine fluids). Additionally, in some embodiments, the mixture further comprises other optional compounds that are useful for paraffin removal and/or enhanced oil recovery, such as, for example, ammonium salts, co-surfactants, and/or enzymes. These additional compounds can be added at concentrations ranging from, for example, about 0.001% to 50%, about 1% to 25%, or about 10%, by weight or volume.

In one embodiment, the method optionally further comprises applying one or more ammonium salts, for example, ammonium hydroxide, ammonium phosphate, monoammonium phosphate, diammonium phosphate, ammonium chloride, or another dibasic or monobasic ammonium salt. Advantageously, in one embodiment, ammonium salts can serve pH adjusters, balancing the pH of the mixture towards, or at, a neutral pH (e.g., about pH 6 to 8) even in the presence of acidic substances, such as brine fluids.

In some embodiments, the ammonium salt(s) comprise ammonium hydroxide (e.g., a 70% solution) at a concentration of about 1 ml/L to 10 ml/L, or about 2 ml/L to 8 ml/L, or about 3 ml/L to 5 ml/L; and/or monoammonium phosphate, at a concentration of about 1 g/L to 50 g/L, or about 2 g/L to about 30 g/L, or about 10 g/L to about 20 g/L.

In one embodiment, part (1) of the method optionally further comprises applying one or more co-surfactants. In certain embodiments, the co-surfactant is monoammonium phosphate or a surfactant as described previously herein, e.g., a MEL or an esterified fatty acid.

In one embodiment, the selection of ingredients utilized in part (1) of the subject methods can be customized for a particular well given the type of paraffin deposit present therein (e.g., complex paraffins, short chain paraffins, etc.). Thus, in one embodiment, the method can comprise, prior to part (1), taking a sample of the paraffin from the well, analyzing it to determine what type of paraffins are present therein, and determining what formulation of components is needed to treat the well.

In certain embodiments, in addition to dissolving solidified paraffin deposits, part (1) can be useful for the dispersal of precipitated paraffin and/or other contaminating substances, thus allowing for more efficient removal of these contaminants from the crude oil and from equipment. Dispersal of precipitates decreases the concentration of contaminants available in the oil to deposit on or in the oil and gas equipment.

Advantageously, the dispersed paraffin does not recrystallize after treatment, but remains suspended and/or emulsified in the crude oil fluids. Thus, the subject invention can also be used for preventing precipitation and/or deposition of paraffin from occurring, or can delay or completely remove the necessity for preventative maintenance related to removing precipitates and deposits, as well as the need for replacing or repairing equipment parts.

Advantageously, in preferred embodiments, applying part (1) of the subject methods to a well can efficiently liquefy solid paraffin and prevent it from recrystallizing at, for example, less than 90° C., less than 50° C., less than 25° C., and even less than 0° C., for example from −3° C. to −32° C. Thus, the method can be used to replace dangerous high heat steaming methods that are commonly employed for paraffin removal. Furthermore, the method can be utilized in recovery and transport of oil in locations where lower temperatures might cause paraffin deposition, such as, for example, in offshore wells, in the arctic or Antarctic, and in climates that experience cold winter temperatures. In one embodiment the method can be useful at temperatures below 0° C., for example, even as low as −32° C. or lower.

In addition to paraffin removal, part (1) of the subject methods can be used for preventing corrosion associated with rust deposits, which can develop underneath paraffin deposits. In one embodiment, the compositions and methods can also help release other rust deposits from oilfield casings and other related equipment.

Furthermore, the subject invention can be used to inhibit bacterial growth within an oil well or associated equipment, including inhibiting biofilm formation and/or disrupting biofilms present on the surfaces of equipment. The invention can be useful against Gram-negative and Gram-positive bacteria, such as chemoautotrophic bacteria, sulfate-reducing bacteria, sulfuric acid-producing bacteria, iron-oxidizing bacteria, and/or acid or ammonia-producing bacteria, and can help protect oil and gas production equipment from MIC.

Even further, in one embodiment, application of part (1) can alter the cloud point and/or pour point of crude oil, for example, by lowering the oil's cloud point and/or pour point. Reduction in cloud point and/or pour point allows for the methods and composition of the subject invention to be utilized in lower temperatures, for example, with offshore oil wells, in formations and equipment present or being transported in colder climates, and/or during the winter. This is because, in the case of pour point, the temperature at which the oil crystallizes and/or freezes is lower, and in the case of cloud point, the temperature at which the dissolved solids and paraffins in the oil precipitate is lower. Thus, the subject invention can be used to prevent re-deposition of paraffins while pumping and transport, even in colder temperatures.

In one embodiment, the subject invention can lower the pour point of paraffinic crude oil to about −25° F., or to about −32° C.

In one embodiment, the subject methods can be used to remove and/or dissolve scale present in a formation and/or on equipment. These problematic deposits can be formed by, for example, deposits of precipitated mineral salts, which can arise as a result of, for example, changes in the pressure, composition and/or temperature of the crude oil. Scales can result from precipitates of, for example, barium sulfate, calcium carbonate, strontium sulfate, calcium sulfate, sodium chloride, silicon dioxide, iron sulfide, iron oxides, iron carbonate, silicates, phosphates and oxides, or any of a number of compounds that are insoluble or mildly soluble in water.

In one embodiment, the methods of the subject invention can be used for preventing corrosion associated with rust deposits, which can develop underneath paraffin deposits. In one embodiment, the compositions and methods can also help release other rust deposits from oilfield casings and other related equipment.

In one embodiment, the methods can be used to inhibit bacterial growth within an oil well or associated equipment, including inhibiting biofilm formation and/or disrupting biofilms present on the surfaces of equipment. The invention can be useful against Gram-negative and Gram-positive bacteria, such as chemoautotrophic bacteria, sulfate-reducing bacteria, sulfuric acid-producing bacteria, iron-oxidizing bacteria, and/or acid or ammonia-producing bacteria, and can help protect oil and gas production equipment from MIC.

In one embodiment, the methods can open up channels and pores that are clogged with paraffin deposits, as well as with the adhesive/cohesive matrices that form when scale, polymers, sand, and other materials become lodged in the paraffin, thus allowing for improved formation permeability and oil production. In one embodiment, the subject methods can also alter the wettability of formation rock so that it is water-wet. Thus, the subject methods can be used to remediate formation "skin damage."

Skin damage is an occurrence characterized by a zone of reduced permeability within the vicinity of the wellbore. The reduction in permeability can be a result of, for example, deposits, such as paraffins, asphaltenes, and bacterial biofilms, as well as alterations in the wettability of formation rock from water-wet to oil-wet due to, for example, contaminating deposits, oil-based drilling fluids, and the use of BTEX solvents.

Even further, the methods can be utilized in mature oil wells, or wells where hot oiling has been implemented. These types of wells can contain deposits of complex paraffins, as well as deposits having greater thickness and/or solidity than other wells.

There are multiple ways that the method of removing or preventing contaminant buildup in gas and oil wells and equipment may be implemented according to the subject invention. The volume of treatment used can be determined taking into account, for example, formation porosity, permeability and thickness. In one exemplary embodiment, paraffin removal and dispersal can be achieved by applying between about 200-600 gallons of treatment into and oil well through, for example, the wellbore.

In one embodiment, part (1) is employed to clean a well without implementing parts (2) or (3). For example, a working well, including the surrounding formation, can be maintained and/or cleaned by pouring or injecting the premixed liquid composition down the casing side (back lines) of a well and allowing it to mix with the fluid that is already in the well. When enough fluid is present, the composition can then optionally be circulated by, for example, a pump for 24-72 hours, preferably 48-72 hours. Prior to circulating, the composition may be allowed to set for 8 to 24 hours, for example. The setting time, circulating time and dosage depend on the amount of paraffin and/or other contaminant anticipated to be present, as well as the depth and size of the well. A basic initial dosage can be, but is not limited to, 20 gallons or more of composition and for maintaining a clear structure, at least about 5 gallons of composition per well on periodic basis, e.g. biweekly, monthly, bimonthly.

In another embodiment, wherein part (1) is employed without parts (2) and (3), the composition may be introduced by means of injection pumps into off-shore gas or oil wells to reduce contaminants, particularly paraffin, in well casings and transmission lines. In addition to the problems associated with land oil wells, off-shore wells must overcome the cooling properties of the ocean or sea water on the lines and contents between the bottom of the ocean and the platform. Thus, off-shore wells have a particular problem with paraffin buildup. To treat the lines, from 1-500 gallons, or from 200-600 gallons, up to 1000 barrels, 10,000 barrels, or more, for example, of the liquid composition can be applied at an injection rate of, for example, 1 to 100 gallons per minute.

Up to, for example, 50 wt. % or more of further additives may be applied, as needed, for particular applications, such as to vary the VOC levels, increase penetration of the mixture, decrease viscosity of the mixture, and/or as couplers for solvent insolubles in the mixture.

Suitable additives include, but are not limited to, C8-C14 alcohol ester blends, glycols, glycol ethers, acid esters, diacid esters, petroleum hydrocarbons, amino acids, alkanolamines, amines, methyl or isobutyl esters of C4-C6 aliphatic dibasic esters and n-methyl-2 pyrolidone.

C8-C14 alcohol ester blends include EXXATE 900, 1000, 1200 from Exxon Chemical; glycols include propylene glycol, dipropylene glycol, and triproplylene glycol; and glycol ethers include dipropylene glycol monomethyl ether, propylene glycol monomethyl ether, propylene glycol-n-butyl ether, ethylene glycol monobutyl ether, and diethylene glycol monobutyl ether. Acid esters include methyl oleate and methyl linoleate, and diacid esters include methyl or butyl diesters of glutaric, adipic, and succinic acids. Petroleum hydrocarbons include AROMATIC 100, AROMATIC 150 ISOPAR M, and ISOPAR K.

Amines such as morpholine; 1,3-dimethyl-2-imidazolidinone; 1, 3-propanediamine; 2-amino-1,3-propanediol; and 3-amino propanol; as well as alkanolamines such as triethanolamine, diethanolamine, 2-aminomethyl propanol, and monoethanolamine act as dispersants for contaminants and solubilize fatty acids and oils. Amino acids, provide non-toxic alternatives to monoethanolamine, and act as metal chelators. Methyl or isobutylesters of C4-C6 aliphatic dibasic esters and n-methyl-2 pyrolidone are also useful.

Other additives typically used in cleaning compositions may be used, including water softening agents, sequesterants, corrosion inhibitors, and antioxidants, which are added in amounts effective to perform their intended function. These additives and amounts thereof are well within the skill of the art. Suitable water softening agents include linear phosphates, styrene-maleic acid co-polymers, and polyacrylates. Suitable sequesterants include 1,3-dimethyl-2-immidazolidinone; 1-phenyl-3-isoheptyl-1,3-propanedione; and 2 hydroxy-5-nonylacetophenoneoxime. Examples of corrosion inhibitors include 2-aminomethyl propanol, diethylethanolamine benzotraizole, and methyl benzotriazole. Antioxidants suitable for the present invention include (BHT) 2,6-di-tert-butyl-para-cresol, (BHA) 2,6-di-tert-butyl-para-anisole, Eastman inhibitor O A BM-oxalyl bis (benzylidenehydrazide), and Eastman DTBMA 2,5-di-tert-butylhydroquinone.

All additives should have a flash point greater than 100° F., preferably greater than 150° F. and more preferably 195° F. TCC in order to achieve a final product flash point greater than 200° F.

Part (2)

While paraffin removal on its own is capable of providing a well with short-term enhanced oil recovery due to, for example, the unclogging of equipment and formation pores, additional steps can be implemented for extending the period of enhanced oil recovery by contemporaneously employing multiple additional mechanisms, such as, e.g., repressurization of a subterranean oil bearing formation using carbon dioxide gas.

In one embodiment, immediately after part (1), or about 60 minutes, 30 minutes, 15 minutes, 10 minutes, 5 minutes, 1 minute or less than 30 seconds after part (1), the subject method comprises part (2) for extended enhanced oil recovery, where the amount of oil recovered per day can be increased by, for example, 50, 100, 200 or even 300% or more for 7, 10, 15 days or more (in addition to the enhanced oil production that is achieved through paraffin removal). Advantageously, the subject invention can be used to increase the recoverable reserves in a subterranean formation.

In certain embodiments, part (2) comprises pre-mixing one or more chelating agents, a biosurfactant, a carbonate salt and water, outside of the well under basic conditions (e.g., a pH adjuster is added) to produce a basic composition. This basic composition is injected into the well and mixed in situ with an acid solution. The reaction with the acid solution produces gases that repressurize the formation and increase the flow of oil.

Advantageously, part (2) of the subject method utilizes microbial metabolites and non-toxic biochemicals for delayed release of carbon dioxide. The carbon dioxide that is dissolved in the basic composition remains dissolved, until the composition reacts with the acid to produce carbon dioxide gas. This occurs only once and in a short period of time. This is advantageous compared to continuous injection and/or production of carbon dioxide because it reduces the potential for carbonic acid production and corrosion associated therewith. The subject methods and compositions advantageously can replace current methods of pressurization that utilize pumping of gas into formations, or $CO_2$-producing bacteria, which can lead to establishment of sulfate-reducing bacteria or other potentially corrosive or deleterious microorganisms.

In an exemplary embodiment, the basic composition comprises 20 g/L of EDTA (chelating agent), 10 g/L of the sophorolipid (biosurfactant), 100 g/L of the sodium bicarbonate (carbonate salt) and enough sodium hydroxide (pH adjuster) to completely dissolve the EDTA and bring the pH of the composition to 9.5 or greater.

Advantageously, when injected into a subterranean, oil-bearing formation, the basic composition allows for enhanced oil recovery through three mechanisms. These include delayed production of pressurizing gas, e.g., carbon dioxide, with pH-controlled reaction of a carbonate salt; reduction of interfacial tension with inclusion of a biosurfactant, e.g., SLP; and increased permeability of the formation with inclusion of a scale-dissolving and carbonate rock-solubilizing chelating agent, e.g., EDTA.

In preferred embodiments, part (2) utilizes a chelator or chelating agent, such as those listed previously in Part (1) of the subject description. Advantageously, the chelating agent enhances the efficacy of the EOR composition by dissolving mineral scale build-up that can clog pores and oil well equipment, as well as solubilizing carbonate rock to increase the permeability of a formation. Additionally, the use of a chelating agent can help with removing and/or sequestering trace metals, such as vanadium, nickel, iron and copper, from crude oil. These metals can have deleterious effects on the equipment and reactions involved in the refining process and can negatively affect the overall quality of crude oil.

In one embodiment, EDTA is used as the chelating agent. In another embodiment, a combination of EDTA, citric acid and sodium citrate is used. The chelating agent (or combination thereof) can be added to the composition in amounts of about 5 g/L to 50 g/L or more, from about 10 g/L to about 30 g/L, or more preferably from about 15 g/L to about 25 g/L. In specific embodiments, the chelating agent is EDTA at a concentration of about 20 g/L.

In one embodiment, the basic composition can further comprise a substance for reducing the interfacial tension within a subterranean formation, thereby promoting formation wettability and flow of oil. Preferably, the substance comprises one or more biosurfactants, such as those listed previously in Part (1) of the subject description.

The biosurfactant can be added to the basic composition in amounts of about 1 g/L to 30 g/L or more, from about 5 g/L to about 20 g/L, or more preferably from about 10 g/L to about 15 g/L. In an exemplary embodiment, the biosurfactant is SLP at a concentration of about 10 g/L.

In some embodiments, the composition further comprises a carbonate salt. Carbonates are made from reaction between carbonic acid (aqueous carbon dioxide) and a base (or alkali). Carbonate salts, which herein include bicarbonate salts, are generally considered weak bases. Examples of carbonate salts useful according to the present invention include but are not limited to ammonium bicarbonate, barium carbonate, cesium bicarbonate, calcium bicarbonate, magnesium bicarbonate, magnesite, potassium bicarbonate, sodium percarbonates, sodium carbonate, and sodium bicarbonate.

In preferred embodiments, the carbonate salt is sodium bicarbonate. Preferably, the concentration of sodium bicarbonate is 20 g/L to 200 g/L, more preferably about 50 g/L to 150 g/L, even more preferably, about 75 g/L to about 125 g/L. In a specific embodiment, the sodium bicarbonate concentration is 100 g/L.

In one embodiment, the composition further comprises a pH adjuster. Suitable pH adjusting substances can include, for example, potassium hydroxide, ammonium hydroxide, potassium carbonate or bicarbonate, sodium hydroxide, or mixtures thereof. In preferred embodiments, the pH adjuster is sodium hydroxide. The amount of sodium hydroxide in the composition depends upon the quantity needed to dissolve the chelating agent completely.

In certain embodiments, part (2) comprises pre-mixing the one or more chelating agents, biosurfactant, carbonate salt and water, outside of the well under basic conditions (e.g., a pH adjuster is added) to produce a basic composition for optimal efficacy in enhancing oil recovery. Advantageously, it has been found that up to 10% of sodium bicarbonate can be dissolved in basic solution without releasing carbon dioxide.

More specifically, the process can comprise adding a chelating agent, such as EDTA, to water to form a solution; adding a biosurfactant, preferably an acidic sophorolipid (SLP) composition to the solution; adding a carbonate salt, such as sodium bicarbonate, to the solution; and mixing the solution.

In preferred embodiments, the solution is prepared under basic conditions, meaning a pH adjusting composition (i.e., a base) is added to the solution prior to addition of the carbonate salt. Preferably, the pH adjusting substance is added in an amount that allows for complete dissolution of the chelating agent in the water, which typically requires a pH of 9, 10, 11, 12 or greater. The pH adjusting substance can be, for example, sodium hydroxide.

In a specific embodiment, preparation of the composition comprises: 1) dissolving 20 g/L EDTA in water to form a solution; 2) adding 10 g/L of acidic form SLP to the solution; 3) adding 100 g/L sodium bicarbonate to the solution; 4) mixing the solution for 40 minutes; and 5) letting the solution rest for 20 more minutes. Preferably, the method comprises, sometime after 1) but before 3), adjusting the pH of the solution to at least 9.5, up to pH 10, 11, 12 or greater, by adding an appropriate amount of sodium hydroxide to completely dissolve the EDTA.

Normally, a carbonate salt will ionize in water and will produce carbon dioxide and water when reacted with an acid. The subject composition, however, is prepared in such a way that any reactions can be timed specifically for a controlled release of gas within a formation. Sodium bicarbonate, for example, will not react to form gas when the pH is above 7. When gas production is desired, the composition with the carbonate salt can be mixed with an acid or with acidic brine water to lower the pH.

After the preparation of the basic composition, part (2) further comprises applying the basic composition to the well and mixing the composition in situ with an acid solution.

The composition can be applied in an amount of at least 1,000 barrels, preferably in amounts of at least 500 barrels, even more preferably in the amount of 80 barrels total. In some embodiments, the composition is applied in a range between 80 and 1,000 BBLS, depending on, for example, the depth of the well and the amount of carbon dioxide release that is desired.

In certain embodiments, the acid is injected into the well either immediately prior to or immediately after injection of the basic composition. In one embodiment, the acid solution is 30% citric acid. The time in between application of the basic composition and the acid solution can be, for example, 5 minutes or less, 2 minutes or less, or even 30 seconds or less before or after.

Next, the method comprises injecting water and/or brine to push the composition and acid solution into the formation. Preferably, the injection of water and/or brine is performed quickly (e.g., immediately, or within 5 minutes or less) after the basic composition comes into contact with the acid solution in order for the reaction that produces carbon dioxide gas to occur inside the formation.

The amount of acid solution injected into the well during part (2) can vary depending upon the amount of basic composition that is injected and the acidity of the brine. In one embodiment, the amount of acid solution is an amount sufficient to reduce the pH of the basic composition to 7.0 or below, preferably 6.0 or below, which will activate the release of carbon dioxide gas. In another embodiment, no acid solution is injected, for example, when the brine has an acidic pH (e.g., pH of 2 to 3 or lower) that is sufficient to reduce the pH to 7.0 or lower, preferably, 6.0 or lower.

Part (3)

The subject methods can further comprise part (3), wherein a plugging composition is injected into the well immediately after part (2) to help with gas and pressure buildup, as well as improve flow of oil from the formation. In one embodiment, the plugging composition comprises 1.0-1.5% sodium alginate dissolved in water. In some embodiments, the plugging composition can comprise a biopolymer, such as xanthan gum or guar gum.

In one embodiment, the plugging composition is preferably in liquid form upon injection, but solidifies when it comes into contact with salts present in the brine and formation. The plugging composition will selectively plug larger pores and channels with some non-selective plugging of smaller pores. Over time, the plugging composition will wash out on its own throughout the oil production process; however, if desired, the plugging composition can be deliberately washed out using known methods.

In one embodiment, after completion of part (3) of the subject method, the well can be shut in for a number of hours or days, depending on, for example, the time it takes for carbon dioxide gas to be released, which can depend upon, for example, the porosity of the formation. Preferably, the shut-in time for the subject methods ranges from 8 hours to 30 days, preferably from 12 hours to 3 days, or 24 hours.

In one embodiment, the parts (2) and (3) of the method can be performed in multiple locations within the formation at one time, for example, if it is desirable to have an increased amount of gas or to have more than one area in the formation with increased pressure.

Once carbon dioxide production stops, pumping of oil from the formation can resume after about one or two days of resting.

Supplementation and/or Enhancement of Existing EOR Methods

In one embodiment, the subject compositions and methods can be used alongside and/or to enhance existing mechanical, and/or chemical paraffin prevention and/or remediation treatments. Additionally, any of these methods can be used in combination with added heat, for example, with steam or hot oiling methods.

The subject compositions and methods can be used before and/or after administration of a mechanical, thermal and/or chemical treatment, and/or simultaneously therewith. Furthermore, the subject compositions and methods can simply comprise a mechanical, thermal and/or chemical treatment on its own.

Examples of mechanical treatments include, but are not limited to, scraping, cutting and/or knifing, soluble pigs (made of, e.g., naphthalene or microcrystalline wax) or insoluble pigs (made of, e.g., plastic or hard rubber). Mechanical prevention of paraffin deposition can include the use of plastic or coated pipes, or other low-friction, smooth surfaces on equipment.

Examples of thermal treatments include, but are not limited to, steaming, hot watering and/or hot oiling.

Examples of chemical paraffin treatments include, but are not limited to, non-biological (e.g., produced by chemical purification, isolation, and/or synthesis) surfactants, condensates, solvents and/or inhibitors.

Surfactants are surface active agents having two functional groups, namely a hydrophilic (water-soluble) or polar group and a hydrophobic (oil-soluble) or non-polar group. The hydrophobic group is usually a long hydrocarbon chain (C8-C18), which may or may not be branched, while the hydrophilic group is formed by moieties such as carboxylates, sulfates, sulfonates (anionic), alcohols, polyoxyethylenated chains (nonionic) and quaternary ammonium salts (cationic).

Non-biological surfactants according to the subject compositions and methods include, but are not limited to: anionic surfactants, ammonium lauryl sulfate, sodium lauryl sulfate (also called SDS, sodium dodecyl sulfate), alkylether sulfates sodium laureth sulfate (also known as sodium lauryl ether sulfate (SLES)), sodium myreth sulfate; docusates, dioctyl sodium sulfosuccinate, perfluorooctanesulfonate (PFOS), perfluorobutanesulfonate, linear alkylbenzene sulfonates (LABs), alkyl-aryl ether phosphates, alkyl ether phosphate; carboxylates, alkyl carboxylates (soaps), sodium stearate, sodium lauroyl sarcosinate, carboxylate-based fluorosurfactants, perfluorononanoate, perfluorooctanoate; cationic surfactants, pH-dependent primary, secondary, or tertiary amines, octenidine dihydrochloride, permanently charged quaternary ammonium cations, alkyltrimethylammonium salts, cetyl trimethylammonium bromide (CTAB) (a.k.a. hexadecyl trimethyl ammonium bromide), cetyl trimethylammonium chloride (CTAC), cetylpyridinium chloride (CPC), benzalkonium chloride (BAC), benzethonium chloride (BZT), 5-Bromo-5-nitro-1,3-dioxane, dimethyldioctadecylammonium chloride, cetrimonium bromide, dioctadecyldi-methylammonium bromide (DODAB); zwitterionic (amphoteric) surfactants, sultaines CHAPS (3-[(3-Cholamidopropyl)dimethylammonio]-1-propanesulfonate), cocamidopropyl hydroxysultaine, betaines, cocamidopropyl betaine, phosphatidylserine, phosphatidylethanolamine, phosphatidylcholine, sphingomyelins; nonionic surfactants, ethoxylate, long chain alcohols, fatty alcohols, cetyl alcohol, stearyl alcohol, cetostearyl alcohol, oleyl alcohol, polyoxyethylene glycol alkyl ethers (Brij): CH3-(CH2)10-16-(O—C2H4)1-25-OH (octaethylene glycol monododecyl ether, pentaethylene glycol monododecyl ether), polyoxypropylene glycol alkyl ethers: CH3-(CH2)10-16-(O—C3H6)1-25-OH, glucoside alkyl ethers: CH3-(C1-12)10-16-(O-Glucoside)-3-OH (decyl glucoside, lauryl glucoside, octyl glucoside), polyoxyethylene glycol octylphenol ethers: C8H17-(C6H4)-(O—C2H4)1-25-OH (Triton X-100), polyoxyethylene glycol alkylphenol ethers: C9H19-(C6H4)-(O—C2H4)1-25-OH (nonoxynol-9), glycerol alkyl esters (glyceryl laurate), polyoxyethylene glycol sorbitan alkyl esters (polysorbate), sorbitan alkyl esters (spans), cocamide MEA, cocamide DEA, dodecyldimethylamine oxide, copolymers of polyethylene glycol and polypropylene glycol (poloxamers), and polyethoxylated tallow amine (POEA).

Anionic surfactants contain anionic functional groups at their head, such as sulfate, sulfonate, phosphate, and carboxylates. Prominent alkyl sulfates include ammonium lauryl sulfate, sodium lauryl sulfate (also called SDS, sodium dodecyl sulfate) and the related alkyl-ether sulfates sodium laureth sulfate, also known as sodium lauryl ether sulfate (SLES), and sodium myreth sulfate. Carboxylates are the most common surfactants and comprise the alkyl carboxylates (soaps), such as sodium stearate.

Surfactants with cationic head groups include: pH-dependent primary, secondary, or tertiary amines; octenidine dihydrochloride; permanently charged quaternary ammonium cations such as alkyltrimethylammonium salts: cetyl trimethylammonium bromide (CTAB) a.k.a. hexadecyl trimethyl ammonium bromide, cetyl trimethylammonium chloride (CTAC); cetylpyridinium chloride (CPC); benzalkonium chloride (BAC); benzethonium chloride (BZT); 5-Bromo-5-nitro-1,3-dioxane; dimethyldioctadecylammonium chloride; cetrimonium bromide; and dioctadecyldi-methylammonium bromide (DODAB).

Zwitterionic (amphoteric) surfactants have both cationic and anionic centers attached to the same molecule. The cationic part is based on primary, secondary, or tertiary amines or quaternary ammonium cations. The anionic part can be more variable and include sulfonates. Zwitterionic surfactants commonly have a phosphate anion with an amine or ammonium, such as is found in the phospholipids phosphatidylserine, phosphatidylethanolamine, phosphatidylcholine, and sphingomyelins.

A surfactant with a non-charged hydrophilic part, e.g. ethoxylate, is non-ionic. Many long chain alcohols exhibit some surfactant properties.

Condensates are low-density mixtures of hydrocarbon liquids present as gaseous components in raw natural gas that will condense to liquid state depending on decrease in temperature and changes in pressure. Gas condensates generally comprise propane, butane, pentane, hexane, and other compounds. Condensates can be used as chemical treatments, including as solvents, in paraffin removal in oil and gas wells and equipment.

Examples of solvents and/or condensates according to the subject compositions and methods include, but are not limited to, aliphatic and/or terpenes, terpenoids, acetates, ionic liquids, alcohols, aromatic hydrocarbons, ketones, acetic acid, kerosene, gasoline, diesel, benzene, ethyl benzenes, propyl benzenes, butyl benzenes, toluene, ethyl toluenes, xylene, pentane, alkylene amines, dioxane, carbon disulfide, mesitylene, cumene, cymenes, saturated aliphatic and/or alicyclic hydrocarbons, naphtha, naphthenes, cyclohexane, decalin, tetralin, heptane, octane, cyclooctane, isooctane, cycloheptane, turpentine, carbon tetrachloride, ether alcohol, pinene, dialkyl ether and/or any combination thereof.

In one embodiment, the subject methods can be utilized alongside and/or in combination with enzyme treatments for hydrocarbon deposit removal and/or enhanced oil recovery. Enzymes are typically divided into six classes: oxidoreductases, transferases, hydrolases, lyases, isomerases and ligases. Each class is further divided into subclasses and by action. Specific subclasses of enzymes according to the subject invention include, but are not limited to, proteases, amylases, glycosidases, cellulases, glucosidases, glucanases, galactosidases, moannosidases, sucrases, dextranases, hydrolases, methyltransferases, phosphorylases, dehydrogenases (e.g., glucose dehydrogenase, alcohol dehydrogenase), oxygenases (e.g., alkane oxygenases, methane monooxygenases, dioxygenases), hydroxylases (e.g., alkane hydroxylase), esterases, lipases, ligninases, mannanases, oxidases, laccases, tyrosinases, cytochrome P450 enzymes, peroxidases (e.g., chloroperoxidase and other haloperoxidasese), lactases, extracellular enzymes from *Aspergillus* spp. and other microbial species (e.g., lipases from *Bacillus subtilis, B. lichenformis, B. amyloliquefaciens, Serratia marcescens, Pseudomonas aeruginosa*, and *Staphylococcus aureus*) and other enzyme-based products known in the oil and gas industry.

Growth of Microorganisms

The subject invention provides methods for cultivation of microorganisms and production of microbial metabolites and/or other by-products of microbial growth. In one embodiment, the subject invention provides materials and methods for the production of biomass (e.g., viable cellular material), extracellular metabolites (e.g. small molecules and excreted proteins), residual nutrients and/or intracellular components (e.g. enzymes and other proteins).

In certain embodiments, a microbe growth facility produces fresh, high-density microorganisms and/or microbial growth by-products of interest on a desired scale. The microbe growth facility may be located at or near the site of application, or at a different location. The facility produces high-density microbe-based compositions in batch, quasi-continuous, or continuous cultivation.

In certain embodiments, the microbe growth facilities of the subject invention can be located at or near the location where the microbe-based product will be used (e.g., at or near an oil well) For example, the microbe growth facility may be less than 300, 250, 200, 150, 100, 75, 50, 25, 15, 10, 5, 3, or 1 mile from the location of use.

The microbe growth facilities can produce fresh, microbe-based compositions, comprising the microbes themselves, microbial metabolites, and/or other components of the medium in which the microbes are grown. If desired, the compositions can have a high density of vegetative cells or a mixture of vegetative cells, spores, conidia, mycelia and/or other microbial propagules. Advantageously, the compositions can be tailored for use at a specified location. In one embodiment, the microbe growth facility is located on, or near, a site where the microbe-based products will be used.

Advantageously, in preferred embodiments, the methods of the subject invention harness the power of naturally-occurring local microorganisms and their metabolic by-products to improve oil production, transmission and/or refining. Local microbes can be identified based on, for example, salt tolerance, ability to grow at high temperatures, and the use of genetic identification of the sequences described herein.

The microbe growth facilities provide manufacturing versatility by their ability to tailor the microbe-based products to improve synergies with destination geographies. The microbe growth facilities may operate off the grid by utilizing, for example, solar, wind and/or hydroelectric power. Thus, the microbe-based compositions can be produced in remote locations.

The growth vessel used for growing microorganisms can be any fermenter or cultivation reactor for industrial use. In one embodiment, the vessel may have functional controls/sensors or may be connected to functional controls/sensors to measure important factors in the cultivation process, such as pH, oxygen, pressure, temperature, agitator shaft power, humidity, viscosity and/or microbial density and/or metabolite concentration.

In a further embodiment, the vessel may also be able to monitor the growth of microorganisms inside the vessel (e.g., measurement of cell number and growth phases). Alternatively, a daily sample may be taken from the vessel and subjected to enumeration by techniques known in the art, such as dilution plating technique. Dilution plating is a simple technique used to estimate the number of microbes in a sample. The technique can also provide an index by which different environments or treatments can be compared.

In one embodiment, the cultivation utilizes a medium supplemented with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

In one embodiment, the cultivation supplies oxygenation to the growing culture. One embodiment utilizes slow motion of air to remove low-oxygen containing air and introduce oxygenated air. In the case of submerged fermentation, the oxygenated air may be ambient air supplemented daily through mechanisms including impellers for mechanical agitation of the liquid, and air spargers for supplying bubbles of gas to the liquid for dissolution of oxygen into the liquid.

In one embodiment, the cultivation utilizes a medium supplemented with a carbon source. The carbon source is typically a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, isopropyl, propanol, butanol, pentanol, hexanol, isobutanol, and/or glycerol; fats and oils such as soybean oil, rice bran oil, canola oil, olive oil, corn oil, sesame oil, and/or linseed oil; etc. These carbon sources may be used independently or in a combination of two or more.

In one embodiment, the method comprises use of two carbon sources, one of which is a saturated oil selected from canola, vegetable, corn, coconut, olive, or any other oil suitable for use in, for example, cooking. In a specific embodiment, the saturated oil is 15% canola oil or discarded oil that has been used for cooking.

In one embodiment, the microorganisms can be grown on a solid or semi-solid substrate, such as, for example, corn, wheat, soybean, chickpeas, beans, oatmeal, pasta, rice, and/or flours or meals of any of these or other similar substances.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the form of flours or meals, such as corn flour, or in the form of extracts, such as yeast extract, potato extract, beef extract, soybean extract, banana peel extract, and the like, or in purified forms. Amino acids such as, for example, those useful for biosynthesis of proteins, can also be included.

In one embodiment, inorganic salts may also be included. Usable inorganic salts can be potassium dihydrogen phosphate, dipotassium hydrogen phosphate, disodium hydrogen phosphate, magnesium sulfate, magnesium chloride, iron sulfate, iron chloride, manganese sulfate, manganese chloride, zinc sulfate, lead chloride, copper sulfate, calcium chloride, calcium carbonate, sodium chloride and/or sodium carbonate. These inorganic salts may be used independently or in a combination of two or more.

In some embodiments, the method for cultivation may further comprise adding additional acids and/or antimicrobials in the liquid medium before and/or during the cultivation process. Antimicrobial agents or antibiotics are used for protecting the culture against contamination. Additionally, antifoaming agents may also be added to prevent the formation and/or accumulation of foam during cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the liquid medium may be necessary.

In one embodiment, the method for cultivation of microorganisms is carried out at about 5° to about 100° C., preferably, 15 to 60° C., more preferably, 25 to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control undesirable bacterial growth.

In one embodiment, the subject invention provides methods of producing a microbial metabolite by cultivating a microbe strain of the subject invention under conditions appropriate for growth and production of the metabolite; and, optionally, purifying the metabolite. In a specific embodiment, the metabolite is a biosurfactant. The metabolite may also be, for example, solvents, acids, ethanol, lactic acid, manno-proteins, beta-glucan, proteins, amino acids, peptides, metabolic intermediates, polyunsaturated fatty acids, and lipids. The metabolite content produced by the method can be, for example, at least 20%, 30%, 40%, 50%, 60%, 70%, 80%, or 90%.

The biomass content of the fermentation medium may be, for example from 5 g/l to 180 g/l or more, or from 10 g/l to 150 g/l.

The microbial growth by-product produced by microorganisms of interest may be retained in the microorganisms or secreted into the growth medium. In another embodiment, the method for producing microbial growth by-product may further comprise steps of concentrating and purifying the microbial growth by-product of interest. In a further embodiment, the medium may contain compounds that stabilize the activity of microbial growth by-product.

The method for cultivation of microorganisms and production of the microbial by-products can be performed in a batch, quasi-continuous, or continuous processes.

In one embodiment, all of the microbial cultivation composition is removed upon the completion of the cultivation (e.g., upon, for example, achieving a desired cell density, or density of a specified metabolite). In this batch procedure, an entirely new batch is initiated upon harvesting of the first batch.

In another embodiment, only a portion of the fermentation product is removed at any one time. In this embodiment, biomass with viable cells remains in the vessel as an inoculant for a new cultivation batch. The composition that is removed can be a microbe-free medium or contain cells, spores, mycelia, conidia or other microbial propagules. In this manner, a quasi-continuous system is created.

Advantageously, the methods of cultivation do not require complicated equipment or high energy consumption. The microorganisms of interest can be cultivated at small or large scale on site and utilized, even being still-mixed with their media. Similarly, the microbial metabolites can also be produced at large quantities at the site of need.

Because, in certain embodiments, the microbe-based products can be generated locally, without resort to the microorganism stabilization, preservation, storage and transportation processes of conventional microbial production, a much higher density of live microbes, spores, mycelia, conidia or other microbial propagules can be generated, thereby requiring a smaller volume of the microbe-based product for use in the on-site application or which allows much higher density microbial applications where necessary to achieve the desired efficacy. This allows for a scaled-down bioreactor (e.g., smaller fermentation tank, smaller supplies of starter material, nutrients and pH control agents), which makes the system efficient. Local generation of the microbe-based product also facilitates the inclusion of the growth medium in the product. The medium can contain agents produced during the fermentation that are particularly well-suited for local use.

Locally-produced high density, robust cultures of microbes are more effective in the field than those that have undergone vegetative cell stabilization, have been sporulated or have sat in the supply chain for some time. The microbe-based products of the subject invention are particularly advantageous compared to traditional products wherein cells, spores, mycelia, conidia and/or other microbial propagules have been separated from metabolites and nutrients present in the fermentation growth media. Reduced transportation times allow for the production and delivery of fresh batches of microbes and/or their metabolites at the time and volume as required by local demand.

Advantageously, local microbe growth facilities provide a solution to the current problem of relying on far-flung industrial-sized producers whose product quality suffers due to upstream processing delays, supply chain bottlenecks, improper storage, and other contingencies that inhibit the timely delivery and application of, for example, a viable, high cell- and/or propagule-count product and the associated growth medium and metabolites in which the microbes are originally grown.

Local production and delivery within, for example, 24 hours of fermentation results in pure, high cell density compositions and substantially lower shipping costs. Given the prospects for rapid advancement in the development of more effective and powerful microbial inoculants, consumers will benefit greatly from this ability to rapidly deliver microbe-based products.

Preparation of Microbe-Based Products

The subject invention provides microbe-based products (e.g., yeast fermentation products) for use in removing contaminants (e.g., paraffin) from oil wells, oil production equipment, and subterranean formations. One microbe-based product of the subject invention is simply the fermentation medium containing the microorganism and/or the microbial metabolites produced by the microorganism and/or any residual nutrients. The product of fermentation may be used directly without extraction or purification. If desired, extraction and purification can be easily achieved using standard extraction and/or purification methods or techniques described in the literature.

In an exemplary embodiment, a first yeast fermentation product, designated as "Star 3+," can be obtained via cultivation of a yeast, e.g., *Wickerhamomyces anomalus*, using a modified form of solid state fermentation. The culture can be grown on a substrate with ample surface area onto which the yeasts can attach and propagate, such as, for example, rice, soybeans, chickpeas, pasta, oatmeal or beans. The entire fermentation medium with yeast cells growing throughout, and any growth by-products thereof (e.g., enzymes, solvents, and/or biosurfactants), can be harvested after, for example, 3-5 days of cultivation at 25-30° C. The culture can be blended with the substrate, milled and/or micronized, and optionally, dried. This comprises the Star 3+ product. The composition, which can comprise $10^1$ to $10^{12}$ cells/gram, can be diluted, for example, up to 10, 50, 100, 500, or 1,000 times prior to being mixed with other components.

In an alternative exemplary embodiment, the first yeast fermentation product is obtained using submerged fermentation, wherein the yeast fermentation product comprises liquid broth comprising cells and any yeast growth by-products. A liquid medium containing necessary sources of carbon, nitrogen, minerals and optionally, antimicrobial substances to prevent contaminating bacterial growth can be used. The culture can be grown with an additional carbon source, particularly, a saturated oil (e.g., 15% canola oil, or used cooking vegetable oil). Typically, the pH begins at 5.0-5.5, then decreases to 3.0-3.5, where it is stabilized. The fermentation broth with cells and yeast growth by-products, which can be harvested after, for example, 24-72 hours of cultivation at 25-30° C., comprises this alternative form of the Star 3+ product.

In one embodiment, a second yeast fermentation product can be obtained via submerged cultivation of a biosurfactant-producing yeast, e.g., *Starmerella bombicola*. This yeast is an effective producer of glycolipid biosurfactants, such as SLP. The fermentation broth after 5 days of cultivation at 25° C. can contain the yeast cell suspension and, for example, 150 g/L or more of SLP.

The second yeast fermentation can be further modified if less biosurfactant is desired in the composition. For example, fermentation of *S. bombicola* results in separation of the SLP into a distinguishable layer. This SLP layer can be removed and the residual liquid and biomass, which can still contain 1-4 g/L of residual SLP, can then be utilized a in the subject composition.

In some embodiments, similar products can be produced using other microorganisms if a different microbial metabolite is desired. Accordingly, the parameters of fermentation can be adjusted according to the particular microbe being cultivated.

The microorganisms in the microbe-based product may be in an active or inactive form. In preferred embodiments, the microbes are inactivated prior to adding to the compositions of the subject invention.

The microbe-based products may be used without further stabilization, preservation, and storage. Advantageously, direct usage of these microbe-based products preserves a high viability of the microorganisms up until inactivation, reduces the possibility of contamination from foreign agents and undesirable microorganisms, and maintains the activity of the by-products of microbial growth.

The microbes and/or medium (e.g., broth or solid substrate) resulting from the microbial growth can be removed from the growth vessel and transferred via, for example, piping for immediate use.

In one embodiment, the microbe-based product is simply the growth by-products of the microorganism. For example, biosurfactants produced by a microorganism can be collected from a submerged fermentation vessel in crude form, comprising, for example about 0.001% to about 99% pure biosurfactant in liquid broth.

In one embodiment, the yeast fermentation product according to the subject composition comprises a yeast strain and/or growth by-products thereof.

In certain embodiments, use of yeast fermentation products according to the subject invention can be superior to, for example, purified microbial metabolites alone, due to, for example, the advantageous properties of the yeast cell walls. These properties include high concentrations of mannoprotein as a part of yeast cell wall's outer surface (mannoprotein is a highly effective bioemulsifier) and the presence of biopolymer beta-glucan (an emulsifier) in yeast cell walls. Additionally, the yeast fermentation product further can comprise biosurfactants in the culture, which are capable of reducing both surface and interfacial tension, and other metabolites (e.g., lactic acid, ethyl acetate, ethanol, etc.) in the culture.

Upon harvesting, for example, the yeast fermentation product, from the growth vessels, further components can be added as the harvested product is placed into containers and/or piped (or otherwise transported for use). The additives can be, for example, buffers, carriers, other microbe-based compositions produced at the same or different facility, viscosity modifiers, preservatives, nutrients for microbe growth, tracking agents, solvents, biocides, other microbes and other ingredients specific for an intended use.

Other suitable additives, which may be contained in the formulations according to the invention, include substances that are customarily used for such preparations. Examples of such additives include surfactants, emulsifying agents, lubricants, buffering agents, solubility controlling agents, pH adjusting agents, preservatives, stabilizers and ultra-violet light resistant agents.

Advantageously, in accordance with the subject invention, the microbe-based product may comprise medium in which the microbes were grown. The product may be, for example, at least, by weight, 1%, 5%, 10%, 25%, 50%, 75%, or 100% growth medium. The amount of biomass in the product, by weight, may be, for example, anywhere from 0% to 100%, 10% to 90%, 20% to 80%, or 30% to 70%, inclusive of all percentages therebetween.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C. On the other hand, a biosurfactant composition can typically be stored at ambient temperatures.

Microbial Strains

The microorganisms useful according to the subject invention can be, for example, bacteria, yeast and/or fungi. These microorganisms may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

In preferred embodiments, the microorganism is any yeast or fungus, including, for example, *Acaulospora, Aspergillus, Aureobasidium* (e.g., *A. pullulans*), *Blakeslea, Candida* (e.g., *C. albicans, C. apicola*), *Debaryomyces* (e.g., *D. hansenii*), *Entomophthora, Fusarium, Hanseniaspora* (e.g., *H. uvarum*), *Hansenula, Issatchenkia, Kluyveromyces, Mortierella, Mucor* (e.g., *M. piriformis*), *Penicillium, Phythium, Phycomyces, Pichia* (e.g., *P. anomala, P. guielliermondii, P. occidentalis, P. kudriavzevii*), *Pseudozyma* (e.g., *P. aphidis*), *Rhizopus, Saccharomyces* (*S. cerevisiae, S. boulardii sequela, S. torula*), *Starmerella* (e.g., *S. bombicola*), *Torulopsis, Thraustochytrium, Trichoderma* (e.g., *T. reesei, T. harzianum, T. virens*), *Ustilago* (e.g., *U. maydis*), *Wickerhamomyces* (e.g., *W. anomalus*), *Williopsis*, and/or *Zygosaccharomyces* (e.g., *Z. bailii*).

In one embodiment, the microbial strain is a *Pichia* yeast, or a related species selected from *Wickerhamomyces anonmalus* (*Pichia anomala*), *Meyerozyma guilliermondii* (*Pichia guilliermondii*) and *Pichia kudriavzevii*. In one embodiment, the yeast or fungus is *Starmerella bombicola, Pseudozyma aphidis*, or *Saccharomyces cerevisiae*.

In one embodiment, the yeast is *Wickerhamomyces anomalus*. *W. anomalus* produces a killer toxin comprising exo-β-1,3-glucanase. Additionally, *W. anomalus* produces biosurfactants that are capable of reducing surface/interfacial tension of water, as well as various other useful solvents, enzymes and other metabolites, such as, for example, phytase, glycosidases, ethyl acetate, acetic acid, lactic acid, and ethanol.

In one embodiment, the yeast is *Starmerella bombicola*, which is an effective producer of, for example, glycolipid biosurfactants.

In one embodiment, the yeast is *Meyerozyma guilliermondii*, which is an effective producer of, for example, glycolipid biosurfactants and/or esterified fatty acid compounds.

Other microbial strains can be used in accordance with the subject invention, including, for example, any other yeast and/or fungal strains having high concentrations of mannoprotein and/or beta-glucan in their cell walls and/or that are capable of producing biosurfactants and other metabolites such as, e.g., lactic acid, ethyl acetate and ethanol.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention Example 1—Pour Point Studies for Part (1)

Paraffin extracted from an oil well in Texas, were used to study the capabilities of the liquid composition of part (1) of the subject methods to alter pour point.

To measure the pour point of a sample of the paraffin without treatment, 11 g of paraffin was heated gradually in a hot water bath to a maximum temperature of 87° C. The paraffin was observed for the occurrence of melting throughout the gradual heating. Minimal melting occurred at 87° C., so the pour point was determined to be >87° C.

To measure the pour point of the paraffin with treatment, three separate tests were performed, using the ASTM D97 standard pour point test procedure as a loose guideline. Three samples from the same paraffin were treated with identical amounts of a composition according to the subject invention. The samples were then heated preliminarily for 2 hours at 35° C.

The samples were mixed and then chilled to allow for formation of the paraffin wax crystals, with examination of the samples for flow characteristics occurring at every −3° C. temperature interval. The lowest temperature at which movement of the sample is observed is recorded as the pour point.

The mixture in each sample was observed until it became solid, which occurred at −3° C. This temperature was determined to be the pour point for this particular paraffin when treated with the subject composition. The pour point value was reduced from the pour point measured in the untreated sample.

As shown in FIG. 1, at −3° C., the mixture of paraffin and treatment composition separated into a lower, solid paraffin portion and a top liquid portion. The liquid portion, comprising D-limonene and canola oil, separated from the mixture while it was being chilled and remained in liquid form at the −3° C. temperature.

In a second pour point study, paraffinic Texas Permian crude that was treated with the composition of part (1) of the subject methods was tested for pour point depression. The method of testing used was the ASTM D5950 standard test method for pour point of petroleum products (automatic tilt method). The resulting pour point value was about −25° F., or about −32° C.

Example 2—Determination of Solubility of Sodium Bicarbonate

Initial experiments were performed to determine the solubility of sodium bicarbonate in different solutions and to find the most suitable acid for converting an amount of dissolved sodium bicarbonate into carbon dioxide gas. It was determined that citric acid is acceptable for initiating the reaction. The process takes place according to the formula:

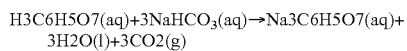

$$H_3C_6H_5O_7(aq)+3NaHCO_3(aq)\rightarrow Na_3C_6H_5O_7(aq)+3H_2O(l)+3CO_2(g)$$

Accordingly, 1 mole of citric acid reacts with 3 moles of sodium bicarbonate to produce 3 moles of carbon dioxide, meaning that 1 kg of sodium bicarbonate fully reacts with 762.7 g citric acid to produce 270.25 L of carbon dioxide. From these calculations, it was determined that sodium bicarbonate can be dissolved in basic solution up to 10% without releasing carbon dioxide.

Example 3—Preparation and Testing of Basic Composition for Part (2)

Figure 2A:
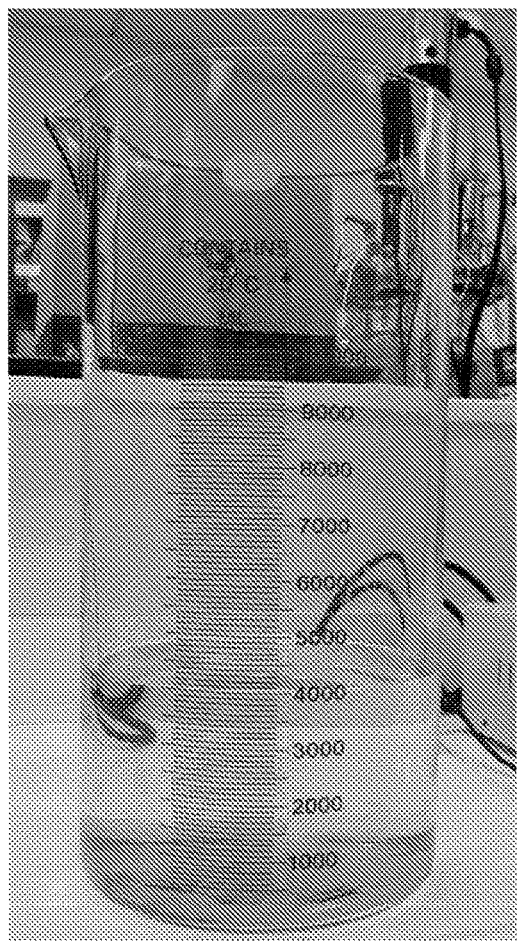
FIGS. 2A-2B show the appearance of the basic composition according to part (2) of the subject methods before (2A) and after (2B) adding 200 ml of 30% citric acid.

The basic composition of part (2) of the subject methods is prepared according to the following steps:
1. 20 g/L EDTA is added to water;
2. 10 g/L acidic SLP is added to the water;
3. Sodium hydroxide is added until all remaining EDTA is dissolved
4. 100 g/L sodium bicarbonate is added to the water;
5. The solution is mixed for 40 minutes;
6. The solution is left to rest for 20 minutes;

The solution has a pH of approximately 9.5, which is important for the proper timing of carbon dioxide release when injected into a well. The color is colorless to slightly yellow, and the solution is clear, with no dispersion. As shown in FIG. 2A, there is no release of carbon dioxide with the composition prepared in this way.

Figure 2B:
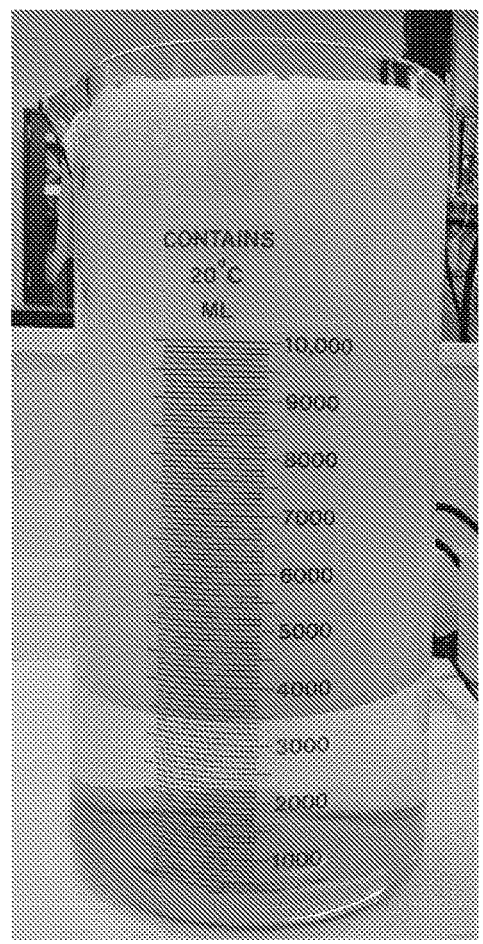

In FIG. 2B, however, where 200 ml of 30% citric acid is added into 4 L of the composition, a powerful release of carbon dioxide takes place. The addition of 200 ml of 30% citric acid was repeated 11 times, and gas was released after each of these repetitions. It was concluded that the formulation is stable (with no release of carbon dioxide) and mixing with citric acid produces large amounts of carbon dioxide from sodium bicarbonate.

Example 4—Gas Release Compared with Meor

Experimental work was conducted using aged sand containing oil with API gravity of 32.3. To produce the aged sands, 700 ml of oil are mixed with 5.5 kg of sand (13%) in cylinders and "aged" at 60° C. for 3 days.

A composition according to part (2) of the subject methods is added to one cylinder having aged sands therein. The other cylinder comprises an MEOR, yeast-based treatment. The gas releasing capabilities of the two treatments are tested by adding citric acid to the cylinders.

FIG. 3A shows the sands treated with the MEOR treatment, which displays more compact sands, indicating less carbon dioxide release. FIG. 3B shows the sands treated with a composition according to part (2) of the subject methods, which displays large pockets of air, indicating carbon dioxide release.

Example 5—Comparative Study of Oil Recovery

Three different treatments are compared for recovery of oil from aged sands prepared as described in Example 4:
1. 30 g of sand added to 20 ml of water.
2. 30 g of sand added to 20 ml of yeast fermentation product.
3. 30 g of sand added to 20 ml of basic composition according to part (2) of the methods.

Citric acid (30%, 3 ml) is added to each. Carbon dioxide was released immediately after contacting the test tubes with citric acid. After 4.5 hours (FIGS. 4A-4B), the composition according to part (2) of the subject methods continued to release carbon dioxide.

Example 6—Gas Release Using Pre-Treatment with Acid and Alginate Plugging

Experiments were conducted to mimic oil movement through a capillary system to increase permeability and determine the effect of adding acid into an oil well prior to application of the basic composition according to part (2) of the subject methods. The experiments also aimed to determine a suitable plugging composition according to part (3) of the subject methods that would help promote lateral release of carbon dioxide in the formation and prevent back-channeling of carbon dioxide after the treatment formulation mixes with the acid.

A cylinder was filled with 60 g of aged sand as prepared in Example 4. Citric acid (6 ml) was added through a silicone tube to make the sand acidic. The cylinder was then plugged by a 1.5% alginate solution, which was not completely dissolved. Two holes were made in the alginate "cup" that formed to allow for gas release. The plugging material proved effective to handle the pressure produced by the carbon dioxide.

Finally, 20 ml of basic solution according to part (2) of the subject methods was added through the silicone tube, after which gas release continued for more than 4 hours. The sample was left overnight and afterwards, produced 8 ml, or about 90% of the oil, on top of the alginate cup through the holes.

Figure 5A:
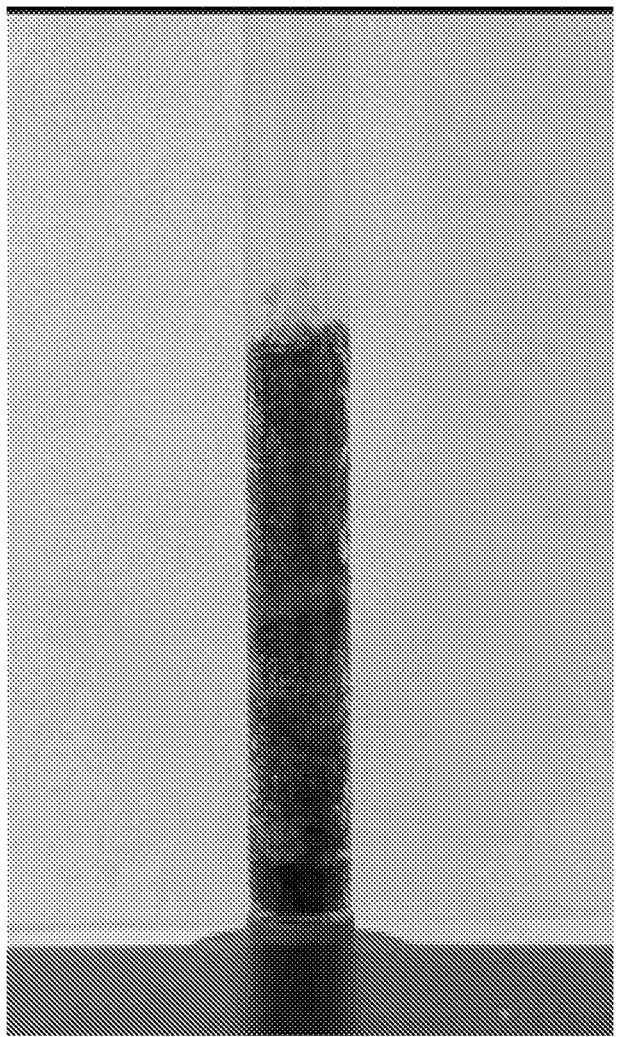
FIGS. 5A-5B show oil recovery from aged sands pretreated with an acid solution and plugged with an alginate solution having holes therein (5A), as well as the oil recovered from the sands after treatment with a basic composition according to parts (2) and (3) of the subject methods (5B).
Figure 5B:
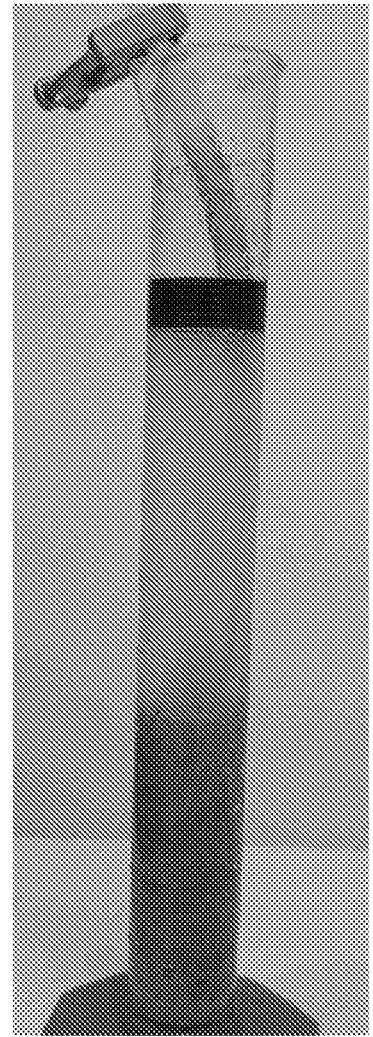

FIG. 5A shows the gas release after addition of the basic composition through the holes in the alginate cup, while FIG. 5B shows the oil recovered on top of the plug after about 4 hours.

We claim:

1. A method for enhancing oil production from an oil well having paraffin deposits therein, the method comprising:
   (1) removing the paraffin deposits by applying one or more solvents selected from isoamyl acetate, primary amyl acetate, d-limonene, dipentene, turpentine, and/or isopropyl alcohol; one or more surfactants; one or more yeast fermentation products comprising broth resulting from cultivation of *Starmerella bombicola*, *Wickerhamomyces anomalus* or *Meyerozyma guilliermondii*, wherein the broth does not comprise living yeast cells; one or more chelating agents selected from EDTA, citric acid, sodium citrate, and a mixture thereof; and, optionally, one or more ammonium salts and/or co-surfactants; to the oil well; and, immediately thereafter,
   (2) mixing EDTA, an acidic sophorolipid biosurfactant, sodium bicarbonate and water in the presence of a basic pH adjuster to form a basic composition; injecting the basic composition into the well either immediately prior to or immediately after injecting an acid solution into the well, wherein the basic composition and the acid react to cause a release of carbon dioxide gas inside the well; injecting brine or water into the well; and, immediately thereafter,
   (3) injecting a plugging composition into the well.

2. The method of claim 1, wherein (1) improves oil production from the well by liquefying or dissolving solid paraffin deposits, dispersing and/or emulsifying precipitated paraffin back into crude oil, freeing stuck or floating rods, and/or opening up clogged channels in the well and/or equipment associated therewith.

3. The method of claim 1, wherein the one or more solvents, one or more surfactants, one or more yeast fermentation products, one or more chelating agents, and, optionally, one or more ammonium salts and/or co-surfactants of (1) are pre-mixed in water and/or brine fluid outside of the well and injected into the well as one liquid mixture.

4. The method of claim 1,
   wherein the one or more solvents and the one or more surfactants of (1) are not produced by the yeasts of the first yeast fermentation product.

5. The method of claim 1, wherein the one or more surfactants of (1) are biosurfactants.

6. The method of claim 5, wherein the biosurfactants are glycolipids, lipopeptides, fatty acid ester compounds, flavolipids, phospholipids, high-molecular-weight biopolymers, lipoproteins, lipopolysaccharide-protein complexes, and/or polysaccharide-protein-fatty acid complexes.

7. The method of claim 6, wherein the glycolipids are rhamnolipids, rhamnose-d-phospholipids, trehalose lipids, trehalose dimycolates, trehalose monomycolates, mannosylerythritol lipids, cellobiose lipids, ustilagic acid, lactonic sophorolipids, and/or acidic sophorolipids.

8. The method of claim 6, wherein the lipopeptides are surfactin, iturin, fengycin, arthrofactin, viscosin, amphisin, syringomycin, and/or lichenysin.

9. The method of claim 5, wherein the one or more biosurfactants are fatty acid ester compounds having the following chemical formula:

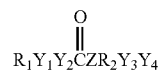

wherein
   $R_1$=$C_6$ to $C_{22}$ saturated or unsaturated hydrocarbon, or an epoxide, or cyclopropane thereof
   $Y_1$=H, $C_1$-$C_5$ hydrocarbon, or hydroxyl at any position along $R_1$
   $Y_2$=H, $C_1$-$C_5$ hydrocarbon, or hydroxyl at any position along $R_1$
   $Y_3$=H, $C_1$-$C_5$ hydrocarbon, or hydroxyl at any position along $R_2$
   $Y_4$=H, $C_1$-$C_5$ hydrocarbon, or hydroxyl at any position along $R_2$
   $R_2$=$C_1$-$C_{10}$ saturated or unsaturated, branched or unbranched, hydrocarbon.

10. The method of claim 9, wherein the fatty acid ester compounds are oleic fatty acid ethyl esters and/or oleic fatty acid methyl esters.

11. The method of claim 5, wherein the biosurfactants are in purified form.

12. The method of claim 1, wherein the one or more optional ammonium salts of (1) comprise ammonium hydroxide and/or monoammonium phosphate.

13. The method of claim 1, wherein (2) occurs about 60 minutes or less after (1).

14. The method of claim 1, wherein the basic composition of (2) comprises sodium hydroxide as the basic pH adjuster.

15. The method of claim 1, wherein the acid solution of (2) comprises 25-35% citric acid.

16. The method of claim 1, wherein brine or water of (2) has a pH of 3.0 or below, and wherein the brine or water replaces the acid solution.

17. The method of claim 1, wherein the plugging composition of (3) comprises sodium alginate, xanthan gum or guar gum.

18. The method of claim 1, used to supplement and/or enhance an existing chemical, thermal and/or mechanical method of enhancing oil recovery.

* * * * *